(12) United States Patent
Soin et al.

(10) Patent No.: US 12,524,444 B2
(45) Date of Patent: *Jan. 13, 2026

(54) SYSTEM AND METHOD FOR GENERATING A GRAPHICAL USER INTERFACE TO TRACK, ANALYZE AND INTERPRET A BIG DATA DATASET

(71) Applicant: The Toronto-Dominion Bank, Toronto (CA)

(72) Inventors: Gurpreet Singh Soin, Toronto (CA); Murtaza Ally Agha, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/824,525

(22) Filed: Sep. 4, 2024

(65) Prior Publication Data

US 2024/0427805 A1 Dec. 26, 2024

Related U.S. Application Data

(63) Continuation of application No. 17/869,004, filed on Jul. 20, 2022, now Pat. No. 12,118,020.

(51) Int. Cl.
*G06F 16/28* (2019.01)
*G06F 3/04842* (2022.01)
(Continued)

(52) U.S. Cl.
CPC ........ *G06F 16/287* (2019.01); *G06F 3/04842* (2013.01); *G06F 3/04845* (2013.01); *G06F 16/2379* (2019.01); *G06F 2203/04803* (2013.01)

(58) Field of Classification Search
CPC ............... G06F 16/287; G06F 3/04842; G06F 3/04845; G06F 16/2379;
(Continued)

(56) References Cited

U.S. PATENT DOCUMENTS 7,860,783 B2 12/2010 Yang et al.
8,571,937 B2 10/2013 Rose et al.
(Continued)

FOREIGN PATENT DOCUMENTS

WO 2009154484 A2 12/2009

OTHER PUBLICATIONS

US 8,700,010 B2, 04/2014, Raleigh et al. (withdrawn)
(Continued)

*Primary Examiner* — Debbie M Le
(74) *Attorney, Agent, or Firm* — Rowand LLP

(57) ABSTRACT

A computer server system comprises a communications module; a processor coupled with the communications module; and a memory coupled to the processor and storing processor-executable instructions which, when executed by the processor, configure the processor to obtain, from at least one big data source, a big data dataset that includes transaction data; categorize the transaction data into a number of data buckets; analyze the transaction data from at least one of the data buckets to generate at least one graphical user interface to display at least some of the transaction data from the at least one of the data buckets, the at least one graphical user interface including at least one selectable interface element to adjust a display of the graphical user interface; and send, via the communications module and to a computing device, the at least one graphical user interface for display. Categorizing the dataset into the number of data buckets may include using a classifier that assigns data to the data buckets based on a merchant category code.

20 Claims, 30 Drawing Sheets

(51) Int. Cl.
*G06F 3/04845* (2022.01)
*G06F 16/23* (2019.01)

(58) Field of Classification Search
CPC .......... G06F 2203/04803; G06Q 40/02; G06Q 20/401; G06Q 20/4016; G06Q 40/06
See application file for complete search history.

(56) References Cited

U.S. PATENT DOCUMENTS

| | | | |
|---|---|---|---|
| 9,367,872 B1* | 6/2016 | Visbal | H04L 63/1416 |
| 9,504,540 B2* | 11/2016 | Tsai | A61C 8/0066 |
| 9,648,034 B2 | 5/2017 | Bailey et al. | |
| 10,643,214 B2 | 5/2020 | Esman | |
| 10,997,596 B1 | 5/2021 | Thomas et al. | |
| 11,017,403 B2 | 5/2021 | Allbright et al. | |
| 11,113,689 B2 | 9/2021 | Stark et al. | |
| 11,644,955 B1* | 5/2023 | Singamneni | G06F 3/0481 707/722 |
| 2012/0197802 A1 | 8/2012 | Smith et al. | |
| 2019/0279218 A1 | 9/2019 | Adjaoute | |
| 2019/0377819 A1 | 12/2019 | Filliben et al. | |
| 2019/0378051 A1 | 12/2019 | Widmann et al. | |
| 2020/0211022 A1 | 7/2020 | Allbright et al. | |
| 2021/0081948 A1 | 3/2021 | Kala et al. | |
| 2021/0096886 A1 | 4/2021 | McLachlan et al. | |
| 2021/0304207 A1 | 9/2021 | Lo Faro et al. | |
| 2022/0006899 A1 | 1/2022 | Phatak et al. | |
| 2022/0044248 A1 | 2/2022 | Amitai et al. | |
| 2022/0374977 A1 | 11/2022 | Smith | |
| 2023/0005027 A1 | 1/2023 | Tietzen et al. | |
| 2023/0216874 A1* | 7/2023 | Krishna | H04L 63/1425 |

OTHER PUBLICATIONS

Vilalta et al: "Predicting rare events in temporal domains", published in 2002 IEEE International Conference on Data Mining, 2002. Proceedings . . . IEEE, https://ieeexplore.ieee.org/abstract/document/1183991?casa_token=f7H2R_nQVBkAAAAA:9_K_OL7_59UX0eaPkutcRli2Q_Fcn03SKtD24ij-MSKmyRshkbY1YKsriCV4_80Oztr9tUA2x8FQJg, Dec. 12, 2002.

Liangguang et al.: "Enhanced Temporal Graph Embedding for Identifying Fraudulent Transaction on Transaction Networks", published in '2021 18th International Computer Conference on Wavelet Active Media Technology and Information Processing (ICCWAMTIP). IEEE, https://ieeexplore.ieee.org/abstract/document/9674131?casa_token=bZw07C97x5gAAAAA: DnLIHkRr7jec4NQ85hsUooMj8_aYeARDZyY3ecRfRY1JeylDuQ5pAknsGdltnfwd_8iDLIs-SIJg9w Dec. 19, 2021.

* cited by examiner

US 12,524,444 B2

SYSTEM AND METHOD FOR GENERATING A GRAPHICAL USER INTERFACE TO TRACK, ANALYZE AND INTERPRET A BIG DATA DATASET

CROSS-REFERENCE TO RELATED APPLICATIONS

This application is a continuation of U.S. patent application Ser. No. 17/869,004, filed Jul. 20, 2022, the entire contents of which are incorporated herein by reference.

TECHNICAL FIELD

The present application relates to systems and methods for generating a graphical user interface to track, analyze and interpret a big data dataset.

BACKGROUND

Big data often includes data sets that are large and complex. Due to the enormous volume, variety and velocity of big data, it is difficult to track, analyze and interpret big data.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
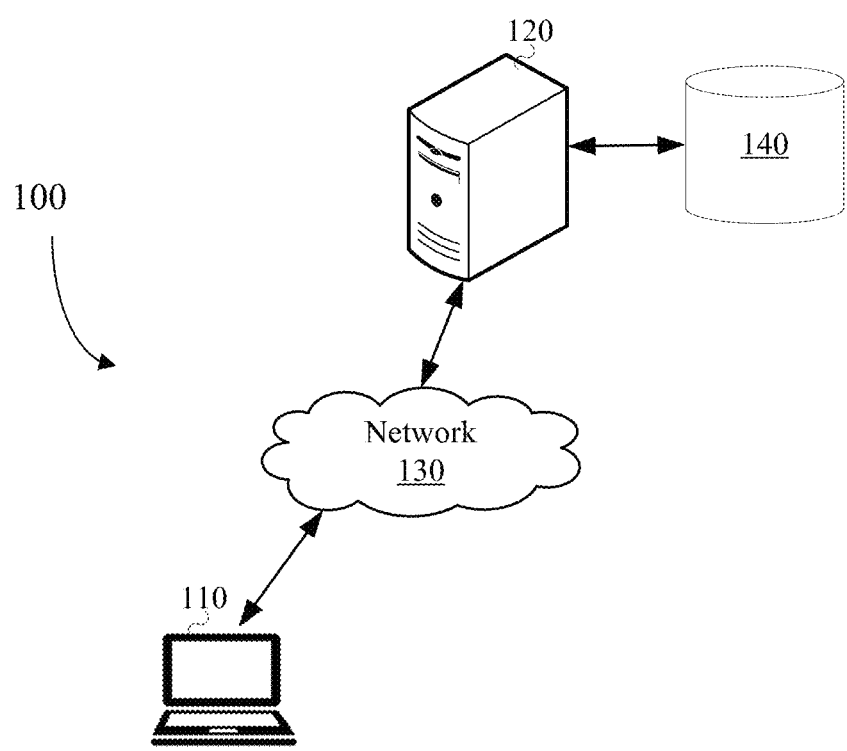
FIG. 1 is a schematic operation diagram illustrating an operating environment of an example embodiment.

Accordingly, in an aspect there is provided a computer server system comprising a communications module; a processor coupled with the communications module; and a memory coupled to the processor and storing processor-executable instructions which, when executed by the processor, configure the processor to obtain, from at least one big data source, a big data dataset that includes transaction data; categorize the transaction data into a number of data buckets; analyze the transaction data from at least one of the data buckets to generate at least one graphical user interface to display at least some of the transaction data from the at least one of the data buckets, the at least one graphical user interface including at least one selectable interface element to adjust a display of the graphical user interface; and send, via the communications module and to a computing device, the at least one graphical user interface for display.

In one or more embodiments, the at least one selectable interface element includes a selectable interface element to enable temporal control to display the at least some of the transaction data from the at least one of the data buckets in increments from a first time period to a second time period.

In one or more embodiments, the processor-executable instructions, when executed by the processor, further configure the processor to receive, via the communications module and from the computing device, a signal indicating selection of the selectable interface element to enable the temporal control to display the at least some of the transaction data from the at least one of the data buckets in increments from the first time period to the second time period; and adjust, in real-time, the at least one graphical user interface to display the at least some of the transaction data in increments from the first time period to the second time period.

In one or more embodiments, the at least one graphical user interface is adjusted to display the at least some of the transaction data in increments from the first time period to the second time period such that the transaction data from a current increment is displayed in a first format and transaction data from one or more previous increments is displayed in a second format.

In one or more embodiments, the first format includes a first shape and wherein the second format includes a dashed line.

In one or more embodiments, a size of the first shape is dependent on at least a fraud amount for the at least one of the data buckets.

In one or more embodiments, the at least one graphical user interface is adjusted to display the at least some of the transaction data in increments from the first time period to the second time period such that a tail is displayed as the graphical user interface is adjusted to display the at least some of the transaction data in increments from the first time period to the second time period.

In one or more embodiments, the at least one graphical user interface includes a plurality of graphical user interface tiles arranged on the display, each one of the graphical user interface tiles to display at least some of the transaction data from at least one of the data buckets.

In one or more embodiments, the at least one selectable interface element to adjust a display of the at least one graphical user interface includes at least one selectable interface element to simultaneously adjust the plurality of graphical user interface tiles arranged on the display.

In one or more embodiments, the data buckets include at least one of authorized transactions, fraud attempts, authorized fraud, avoided fraud, merchant category code, policy declines, strategy declines, manual block declines, or transaction amount.

According to another aspect there is provided a computer-implemented method comprising obtaining, from at least one big data source, a big data dataset that includes transaction data; categorizing the transaction data into a number of data buckets; analyzing the transaction data from at least one of the data buckets to generate at least one graphical user interface to display at least some of the transaction data from the at least one of the data buckets, the at least one graphical user interface including at least one selectable interface element to adjust a display of the graphical user interface; and sending, via a communications module and to a computing device, the at least one graphical user interface for display.

In one or more embodiments, the at least one selectable interface element includes a selectable interface element to enable temporal control to display the at least some of the transaction data from the at least one of the data buckets in increments from a first time period to a second time period.

In one or more embodiments, the method further comprises receiving, via the communications module and from the computing device, a signal indicating selection of the selectable interface element to enable the temporal control to display the at least some of the transaction data from the at least one of the data buckets in increments from the first time period to the second time period; and adjusting, in real-time, the at least one graphical user interface to display the at least some of the transaction data in increments from the first time period to the second time period.

In one or more embodiments, the at least one graphical user interface is adjusted to display the at least some of the transaction data in increments from the first time period to the second time period such that the transaction data from a current increment is displayed in a first format and transaction data from one or more previous increments is displayed in a second format.

In one or more embodiments, the first format includes a first shape and wherein the second format includes a dashed line.

In one or more embodiments, a size of the first shape is dependent on at least a fraud amount for the at least one of the data buckets.

In one or more embodiments, the at least one graphical user interface is adjusted to display the at least some of the transaction data in increments from the first time period to the second time period such that a tail is displayed as the graphical user interface is adjusted to display the at least some of the transaction data in increments from the first time period to the second time period.

In one or more embodiments, the at least one graphical user interface includes a plurality of graphical user interface tiles arranged on the display, each one of the graphical user interface tiles to display at least some of the transaction data from at least one of the data buckets and the at least one selectable interface element to adjust a display of the graphical user interface includes at least one selectable interface element to simultaneously adjust the plurality of graphical user interface tiles arranged on the display.

In one or more embodiments, the data buckets include at least one of authorized transactions, fraud attempts, authorized fraud, avoided fraud, merchant category code, policy declines, strategy declines, manual block declines, or transaction amount.

According to another aspect there is provided a non-transitory computer readable storage medium comprising computer-executable instructions which, when executed, configure a processor to obtain, from at least one big data source, a big data dataset that includes transaction data; categorize the transaction data into a number of data buckets; analyze the transaction data from at least one of the data buckets to generate at least one graphical user interface to display at least some of the transaction data from the at least one of the data buckets, the at least one graphical user interface including at least one selectable interface element to adjust a display of the graphical user interface; and send, via a communications module and to a computing device, the at least one graphical user interface for display.

In manners described herein, a server computer system obtains a big data dataset that includes transaction data. The server computer system categorizes the transaction data into a number of data buckets and generates at least one graphical user interface to display at least some of the transaction data from at least one of the data buckets. The graphical user interface includes at least one selectable interface element for adjusting a display of the graphical user interface. In this manner, the server computer system generates a graphical user interface that may be used to track, analyze and interpret big data that includes the transaction data. The graphical user interface may be used to generate fraud strategies and/or fraud policies in an attempt to reduce or eliminate the risk of fraudulent transactions.

In manners described herein, the selectable interface elements may be utilized to generate a graphical user interface for a particular data bucket or for particular data buckets. The selectable interface elements may enable temporal control that may cause the graphical user interface to display the transaction data from at least one of the data buckets in increments from a first time period to a second time period and this may allow big data to be easily and conveniently displayed to generate fraud strategies and/or fraud policies in an attempt to reduce or eliminate the risk of fraudulent transactions. Further, the graphical user interface may allow big data to easily and conveniently be displayed to identify whether or not implemented fraud strategies and/or fraud policies are effective in reducing or eliminating the risk of fraudulent transactions.

In manners described herein, the graphical user interface may include a number of graphical user interface tiles arranged on the display. By allowing multiple graphical user interface tiles to be displayed adjacent to one another on a single display, the user is able to easily and conveniently analyze, track and interpret big data without having to navigate to separate windows or separate screens to view transaction data from one or more data buckets as categorized by the server computer system.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, examples involving a general-purpose computer, aspects of the disclosure transform the general-purpose computer into a special-purpose computing device when configured to execute the instructions described herein.

FIG. 1 is a schematic operation diagram illustrating an operating environment of an example embodiment. As shown, the system 100 includes a computing device 110 and a server computer system 120 coupled to one another through a network 130, which may include a public network such as the Internet and/or a private network. The computing device 110 and the server computer system 120 may be in geographically disparate locations. Put differently, the computing device 110 and the server computer system 120 may be located remote from one another.

The computing device 110 may be a personal computer as shown in FIG. 1. However, the computing device 110 may be a computing device of another type such as for example a laptop computer, a mobile device, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The server computer system 120 is a computer server system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, computer servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

The computing device 110 may be adapted to receive, from the server computer system 120, a signal that causes the computing device 110 to display a graphical user interface that allows for communication with the server computer system 120. For example, the graphical user interface may include one or more selectable interface elements that, when selected, cause the server computer system 120 to perform one or more operations.

The server computer system 120 may be associated with or may communicate with a big data source 140 that stores big data datasets. The big data datasets are classified as big data due to the volume of the data, the variety of the data and/or the velocity of the data. The volume of the data may be associated with enormous amounts of data. The variety of the data may be associated with various data formats. The velocity of the data may be associated with real-time updates of the data.

In one or more embodiments, the big data datasets include transaction data. The transaction data may include transaction data associated with genuine transactions and may include transaction data associated with fraudulent transactions. Genuine transactions may include transactions that were successfully completed and/or transactions that were declined but have since been flagged as genuine. Fraudulent transactions may include transactions that were declined and/or transactions that were completed but have since been flagged as fraudulent.

The transaction data includes an account such as a credit card account used for the transaction, an amount of the transaction, an identifier of the merchant who conducted the transaction, a merchant category code (MCC) that classifies the merchant into a particular good or service provided, a date of the transaction, a flag that identifies or defines the transaction as a genuine transaction or a fraud transaction, a location of the transaction.

The server computer system 120 may be associated with a financial institution and as such the big data datasets stored by the big data source 140 may include transaction data for some or all of the customers of the financial institution. The big data source 140 may be updated in real-time.

In embodiments where the server computer system 120 is associated with a financial institution, the transaction data may additionally include information associated with a genuine transaction or a fraud transaction. For example, the transaction data may indicate whether a fraud transaction was declined based on a policy decline, a strategy decline or a manual block decline.

In one or more embodiments, a policy decline may be a transaction that was declined or flagged as fraud based on one or more policies set by the financial institution. A strategy decline may be a transaction that was declined or flagged as fraud based on a strategy implemented by the financial institution in an attempt to reduce the amount of fraud transactions. A manual block decline may be a transaction that was declined or flagged as fraud manually by an operator associated with the financial institution.

The server computer system 120 may communicate with the big data source 140 directly or through the network 130. It will be appreciated that in one or more embodiments, the big data source 140 may be cloud-based.

Figure 2:
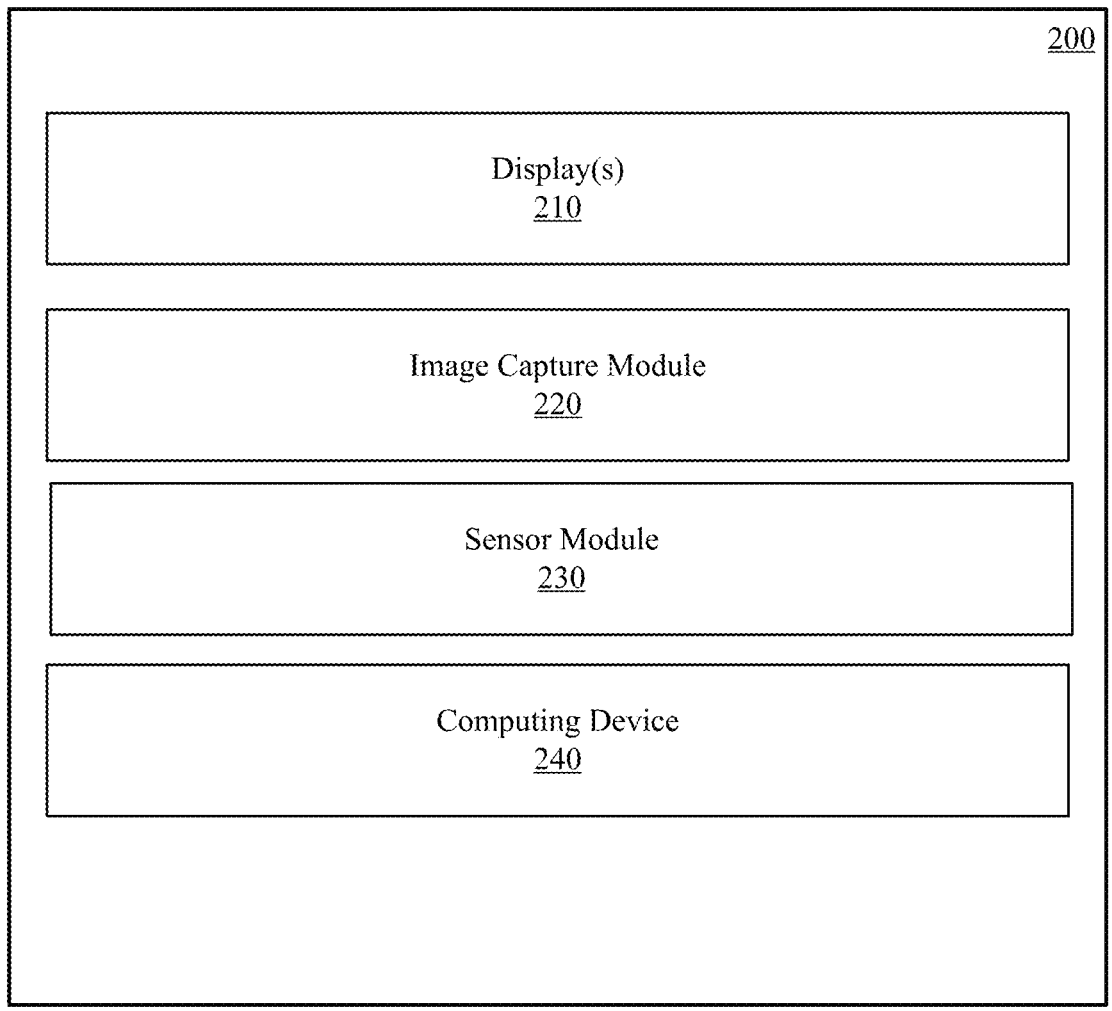
FIG. 2 is a simplified schematic diagram showing components of a computing device.

FIG. 2 is a simplified schematic diagram showing components of an exemplary computing device 200. The computing device 110 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the server computer system 120 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
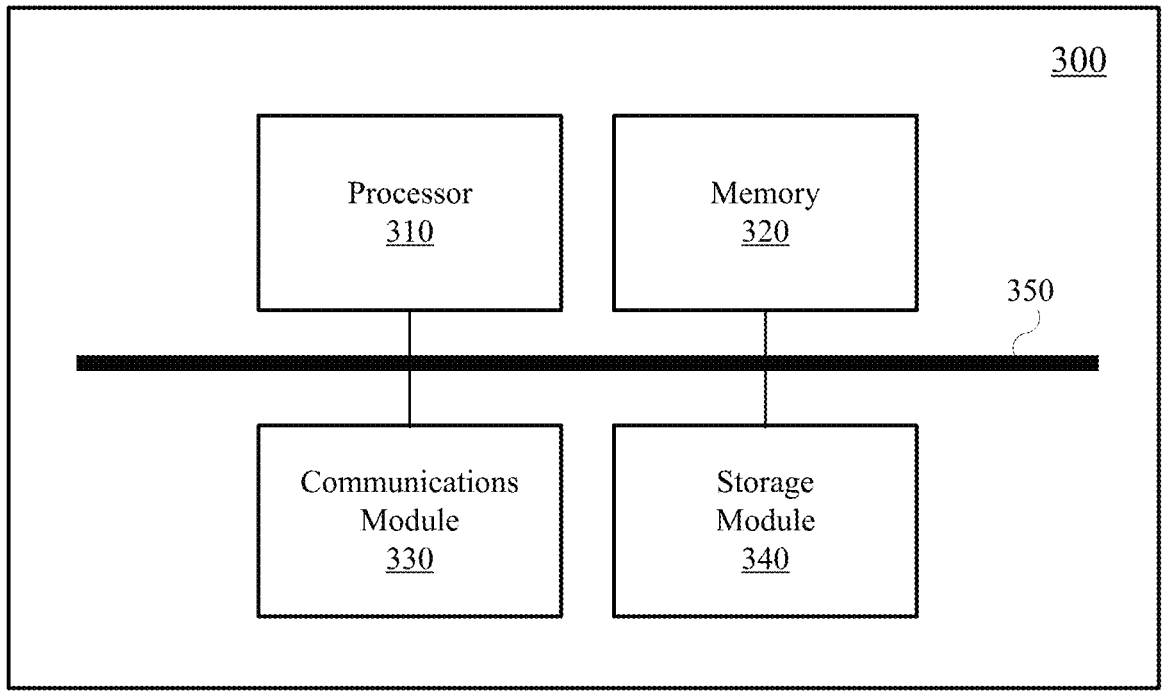
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2) and/or server computer system 120.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are non-transitory computer-readable storage mediums. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
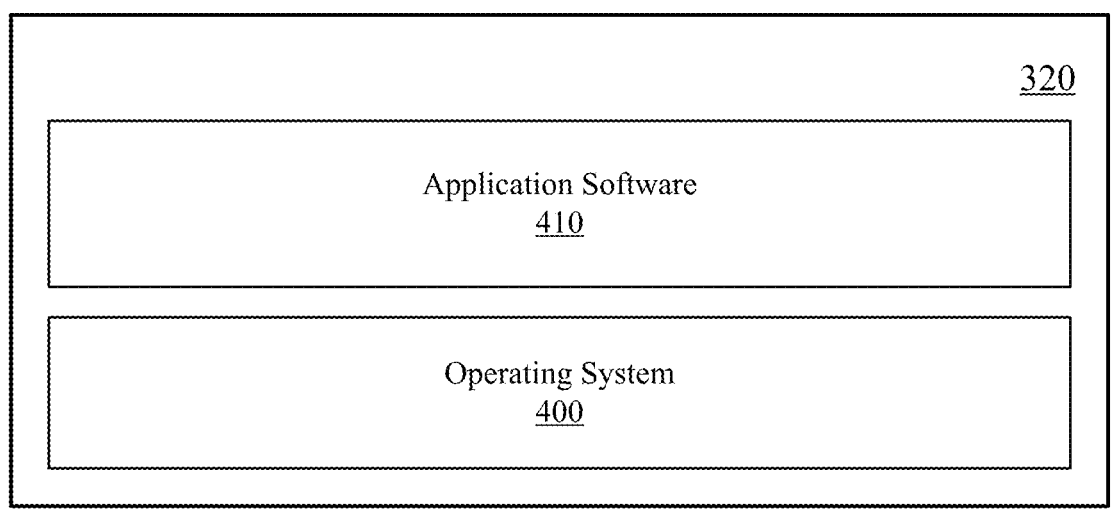
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2) and/or the server computer system 120.

While a single application 410 is illustrated in FIG. 3, in operation the memory 320 may include more than one application 410 and different applications 410 may perform different operations. For example, in at least some embodiments in which the computer device 300 is functioning as the computing device 110, the applications 410 may include an application such as for example a fraud diagnosis tool that may be used to display a graphical user interface that allows the computing device 110 to communicate with the server computer system 120 to perform one or more operations.

The server computer system 120 may obtain, from the big data source, a big data dataset and may analyze the big data dataset to generate the graphical user interface that allows an operator of the computing device 110 to track, analyze and interpret the big data dataset.

Figure 5:
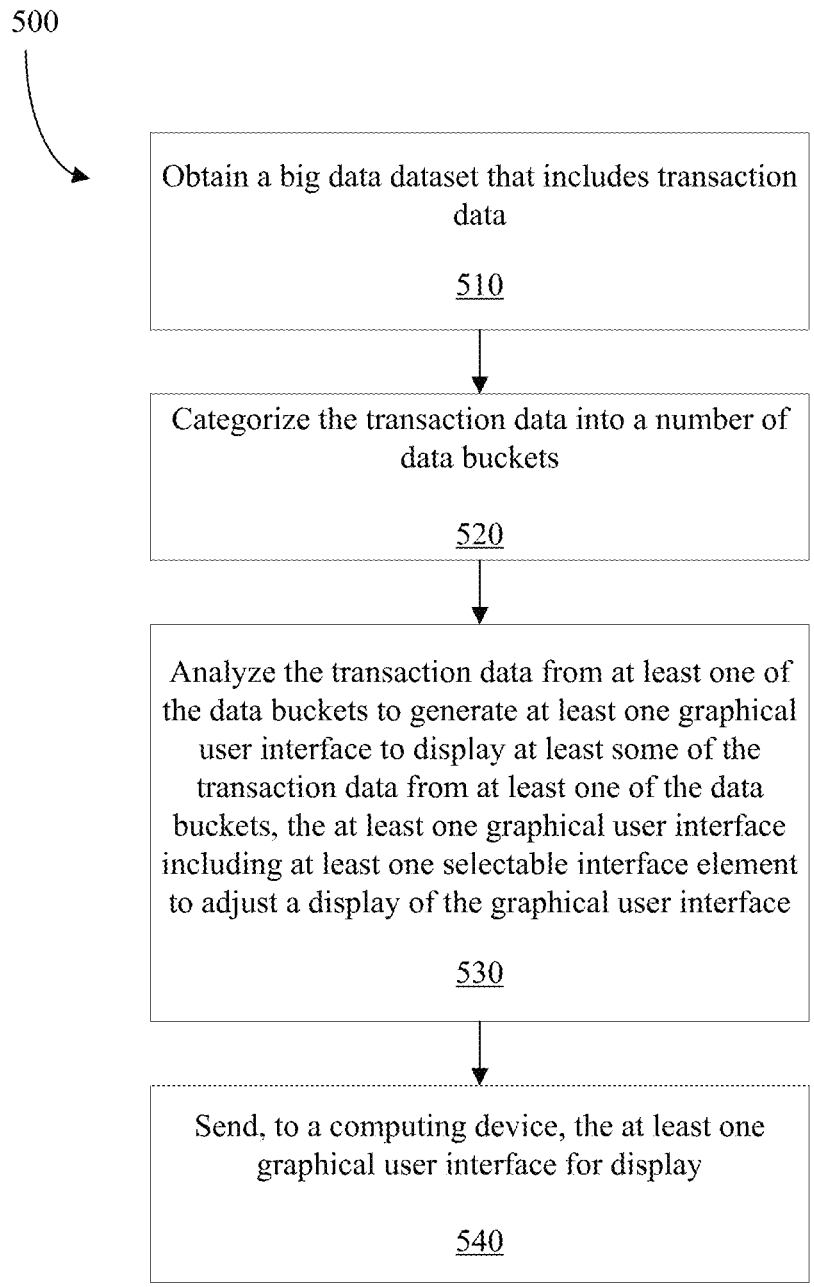
FIG. 5 is a flowchart showing operations performed in generating a graphical user interface to track, analyze and interpret a big data dataset according to an embodiment.

Reference is made to FIG. 5, which illustrates, in flowchart form, a method 500 for generating a graphical user interface to track, analyze and interpret a big data dataset. The method 500 may be implemented by a computing device having suitable processor-executable instructions for causing the computing device to carry out the described operations. The method 500 may be implemented, in whole or in part, by the server computer system 120. The server computer system 120 may offload some of the operations to the computing device 110.

The method 500 includes obtaining a big data dataset that includes transaction data (step 510).

In one or more embodiments, the server computer system 120 obtains the big data dataset from the big data source 140. The big data dataset includes transaction data. The transaction data may include transaction data associated with genuine transactions and may include transaction data associated with fraudulent transactions. Genuine transactions may include transactions that were successfully completed and/or transactions that were declined but have since been flagged as genuine. Fraudulent transactions may include transactions that were declined and/or transactions that were completed but have since been flagged as fraudulent.

The transaction data includes an account such as a credit card account used for the transaction, an amount of the transaction, an identifier of the merchant who conducted the transaction, a merchant category code (MCC) that classifies the merchant into a particular good or service provided, a date of the transaction, a flag that identifies or defines the transaction as a genuine transaction or a fraud transaction, a location of the transaction. The transaction data may additionally include information associated with a genuine transaction or a fraud transaction. For example, the transaction data may indicate whether a fraud transaction was declined based on a policy decline, a strategy decline or a manual block decline.

The method 500 includes categorizing the transaction data into a number of data buckets (step 520).

It will be appreciated that the amount of data in the big data dataset is very large and as such to reduce or minimize the amount of processing required to generate a graphical user interface, the server computer system 120 categorizes the transaction data into data buckets. The data buckets are used to group together transactions that have one or more similarities as defined by the transaction data.

The server computer system 120 categorizes the transaction data into a number of data buckets based on at least some of the transaction data. In one or more embodiments, the data buckets may include at least one of authorized transactions, fraud attempts, authorized fraud, avoided fraud, merchant category code, policy declines, strategy declines, manual block declines, and/or transaction amount.

As one example, the server computer system 120 may categorize the transaction data into merchant category code. In this example, all transactions that have a particular merchant category code defined within the transaction data are grouped into a data bucket associated with the particular merchant category code. In one example, a merchant category code of 5732 may be assigned to merchants categorized under "Electronics Stores." A data bucket may be generated for the merchant category code 5732 and as such all transactions that have transaction data that include the merchant category code 5732 may be assigned to the data bucket.

It will be appreciated that transactions may be assigned to different data buckets. Put another way, transactions may be included in one or more data buckets. For example, a first data bucket may be defined for transaction amounts between $500 and $1000 and as such all transactions that have transaction data that includes a transaction amount between $500 and $1000 may be included in the data buckets. A second data bucket may be defined for the merchant category code of 5732 and as such all transactions that have transaction data that include the merchant category code 5732 may be assigned to the second data bucket. In this example, a transaction that includes a transaction amount between $500 and $1000 and that includes the merchant category code 5732 may be categorized into both the first data bucket and the second data bucket.

The method 500 includes analyzing the transaction data from at least one of the data buckets to generate at least one graphical user interface to display at least some of the transaction data from at least one of the data buckets, the at least one graphical user interface including at least one selectable interface element to adjust a display of the graphical user interface (step 530).

The at least one graphical user interface may be generated from the at least one of the data buckets based on one or more key performance metrics defined by the server computer system 120. The key performance metrics may include authorized transactions, fraud attempts, gross authorized fraud, attempted fraud rate, declined transactions, auto blocks, false positive decline rate, detection rate, and/or merchant category codes.

Authorized transactions may include all transactions authorized by the financial institution whether true fraud or not. The authorized transactions within the at least one data bucket may be calculated as a sum of a transaction amount for all authorized transactions and/or as a count of a number of authorized transactions.

Fraud attempts may include all transactions that are true fraud whether authorized by the financial institution or not. The fraud attempts within the at least one data bucket may be calculated as a sum of a transaction amount for all fraud attempts and/or as a count of a number of fraud attempts.

Gross authorized fraud may include all true fraud transactions that were authorized by the financial institution. The gross authorized fraud within the at least one data bucket may be calculated as a sum of a transaction amount for all true fraud transactions and/or as a count of a number of true fraud transactions.

Attempted fraud rate may include a measure of a rate at which fraudsters are attempting fraudulent transactions. The attempted fraud rate within the at least one data bucket may be calculated as fraud attempts divided by authorized transactions and multiplied by 10000. The attempted fraud rate may be calculated as a number of basis points.

Authorized fraud rate may include a measure of a rate at which true fraud transactions get approved by the financial institution. The authorized fraud rate within the at least one data bucket may be calculated as gross authorized fraud divided by authorized transactions and multiplied by 10000. The authorized fraud rate may be calculated as a number of basis points.

Declined transactions may include all transactions that are declined as a result of policy, strategy and/or manual blocks. The declined transactions within the at least one data bucket may be calculated as a sum of a transaction amount for all declined transactions and/or as a count of a number of declined transactions.

Auto blocks may include all transactions that were automatically blocked or declined by the financial institution. The auto blocks within the at least one data bucket may be calculated as a sum of a transaction amount for all auto blocks and/or as a count of a number of auto blocks.

False positive decline rate may include a measure of all genuine transactions that are inaccurately declined by fraud strategies implemented by the financial institution. The false positive decline rate within the at least one data bucket may be calculated as a count of non-fraud transactions declined divided by a count of attempted transactions and multiplied by 100. The false positive decline rate may be calculated as a percentage.

Detection rate may include a measure of all true fraud transactions accurately detected by fraud strategies implemented by the financial institution. The detection rate within the at least one data bucket may be calculated as a count of true fraud transactions declined by fraud strategies divided by a count of fraud attempts and multiplied by 100. The detection rate may be calculated as a percentage.

The merchant category codes may include a category/sub-category of merchant types. The merchant category codes within the at least one data bucket may be determined as a count of each merchant category code within the at least one data bucket.

The at least one graphical user interface may be generated based on one or more of the key performance metrics. In one or more embodiments, the at least one graphical user interface may be generated to include one or more graphs or charts used to display transaction data within the at least one data bucket in increments from a first time period to a second time period. The increments may include, for example, every day, month, quarter, year, etc. The first time period may include a past time period and the second time period may be a current time period. For example, the increment may be every quarter, the first time period may be over the last five (5) years and the second time period may be the current quarter or the most recently completed quarter.

The method 500 includes sending, to a computing device, the at least one graphical user interface for display (step 540).

The server computer system 120 provides the graphical user interface for display on the computing device 110.

In one or more embodiments, the transaction data from a current increment is displayed in a first format and transaction data from one or more previous increments is displayed in a second format. The first format may include a data point in the form of a first shape and the second format may include a dashed line. The dashed line may extend from a previous location of a data point of the previous increment towards a current location of a data point of the current increment. In one or more embodiments, a size of the first shape may be dependent on a value of at least one of the x-axis and the y-axis. For example, the size of the first shape may be dependent on a fraud amount from at least one of the data buckets. The fraud amount may be a total amount of fraud as calculated using data from the at least one of the data buckets for the current increment.

In one or more embodiments, the at least one graphical user interface is adjusted to display the at least some of the transaction data in increments from the first time period to the second time period such that a tail is displayed as the graphical user interface is adjusted to display the at least some of the transaction data in increments from the first time period to the second time period.

Figure 7:
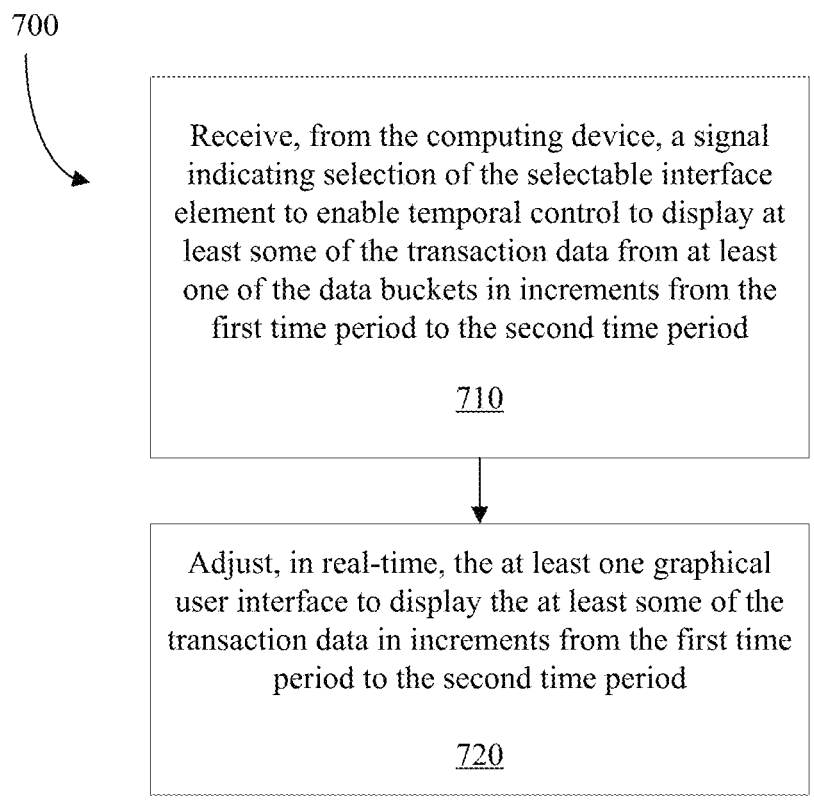
FIG. 7 is a flowchart showing operations performed in adjusting the at least one graphical user interface to display the at least some of the transaction data from at least one of the data buckets in increments from a first time period to a second time period according to an embodiment.

An example graphical user interface 600 is shown in FIG. 7. In this example, the graphical user interface includes a graph 610 of authorized transactions vs. gross authorized fraud for a particular merchant category code. It will be appreciated that in this example, the transaction data analyzed to generate the graph is from a data bucket that includes transactions from the particular merchant category code. Put another way, the data bucket is a data bucket for the particular merchant category code. As shown, the graph 610 displays transaction data from the data bucket for the month of January 2022.

Figure 6:
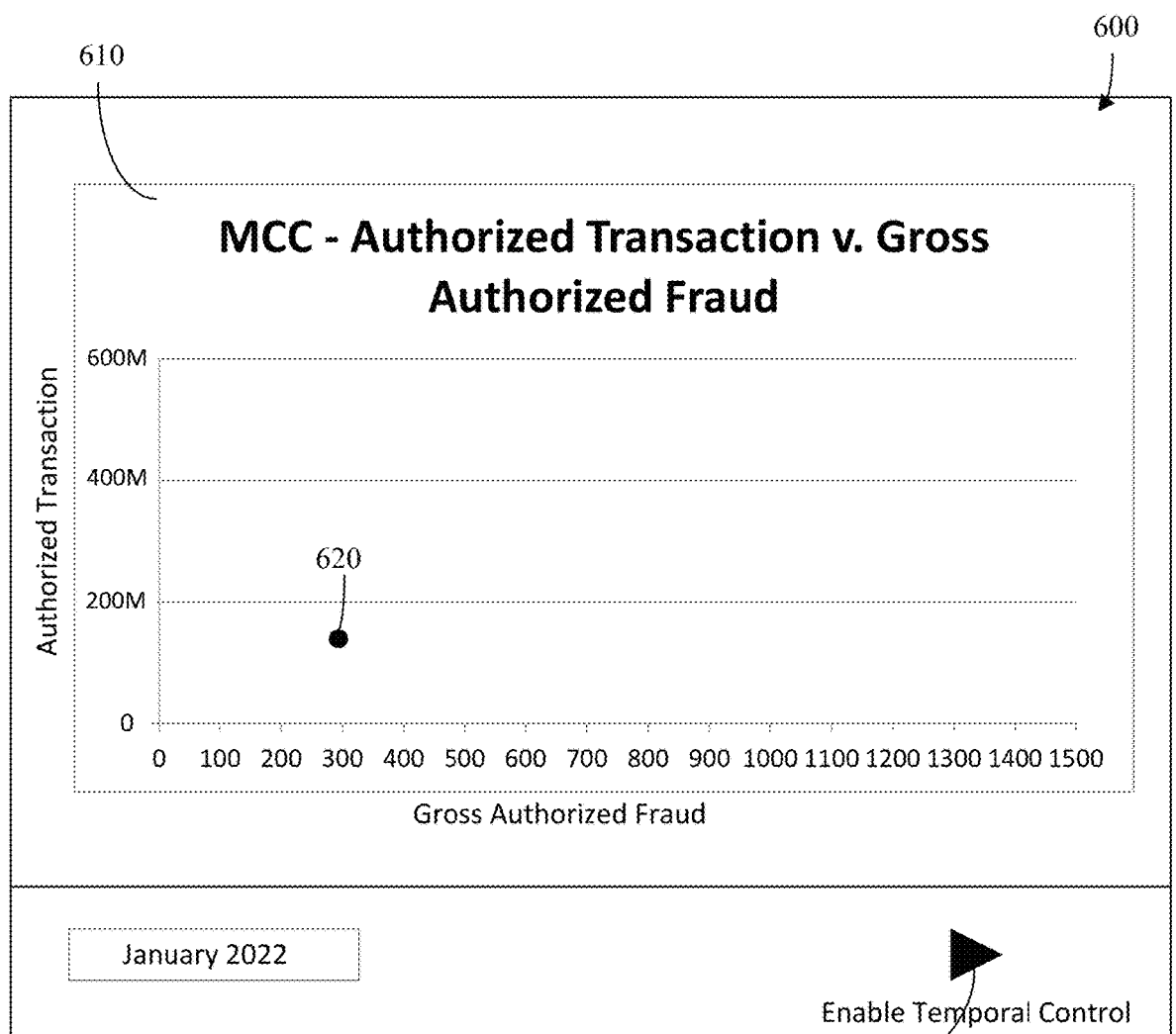
FIG. 6 is an example graphical user interface according to an embodiment.

In the example shown in FIG. 6, transaction data from the current increment is displayed in a first format. The first format is a first shape 620 and the size of the first shape 620 is dependent on a data point corresponding to authorized transactions vs. gross authorized fraud for January 2022.

As mentioned, the graphical user interface includes at least one selectable interface element to adjust a display of the graphical user interface. In this example, the graphical user interface includes a selectable interface element 630 to enable temporal control to display the transaction data from the data bucket in increments from a first time period to a second time period. Responsive to selection of the selectable interface element 630 the computing device 110 may send a signal that may cause the server computer system 120 to update the graphical user interface.

Reference is made to FIG. 7, which illustrates, in flowchart form, a method 700 for adjusting the at least one graphical user interface to display the at least some of the transaction data from at least one of the data buckets in increments from a first time period to a second time period. The method 700 may be implemented by a computing device having suitable processor-executable instructions for causing the computing device to carry out the described operations. The method 700 may be implemented, in whole or in part, by the server computer system 120. The server computer system 120 may offload some of the operations to the computing device 110.

The method 700 includes receiving, from the computing device, a signal indicating selection of the selectable interface element to enable the temporal control to display the at least some of the transaction data from the at least one of the data buckets in increments from the first time period to the second time period (step 710).

Using the example of FIG. 6, the user may select the selectable interface element 630 via an input device such as for example a computer mouse. Responsive to selection of the selectable interface element 630, the computing device 110 may send the signal indicating selection of the selectable interface element to enable the temporal control to display the at least some of the transaction data from the at least one of the data buckets in increments from the first time period to the second time period.

The method 700 includes adjusting, in real-time, the at least one graphical user interface to display the at least some of the transaction data in increments from the first time period to the second time period (step 720).

Responsive to receiving the signal indicating selection of the selectable interface element to enable the temporal control to display the at least some of the transaction data from the at least one of the data buckets in increments from the first time period to the second time period, the server computer system 120 performs operations to adjust the at least one graphical user interface to display the transaction data in increments from the first time period to the second time period. The increments may be every day, month, quarter, year, etc.

In the example shown in FIG. 6, responsive to selection of the selectable interface element 630, the server computer system 120 performs operations to update the graph 610 to display transaction data in increments from the first time period (January 2022) to a second time period. In this example, the increments include one month increments.

Figure 8:
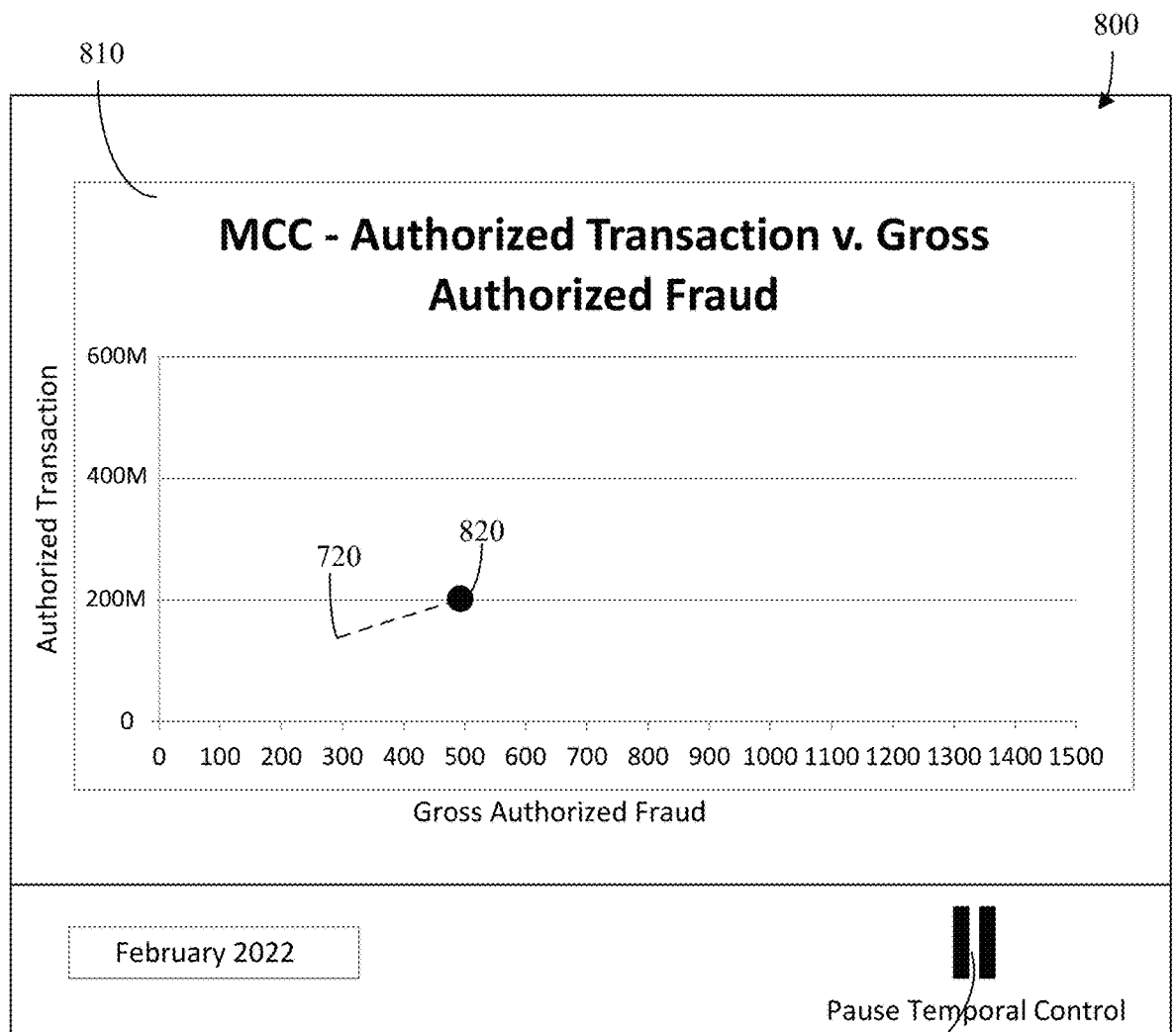
FIGS. 8 to 15 are example graphical user interfaces.

An example updated graphical user interface 800 is shown in FIG. 8. As can be seen, the server computer system 120 has updated the graph 610 which is displayed in FIG. 8 as graph 810. The graph 810 displays transaction data from the data bucket for the month of February 2022.

In the example shown in FIG. 8, transaction data from the current increment is displayed in a first format. The first format is a first shape 820 and the size of the first shape 820 is dependent on a data point corresponding to authorized transactions vs. gross authorized fraud for February 2022. Transaction data from one or more previous increments is displayed in a second format. In this example, the previous increment is January 2022 and as such the second format includes a dashed line that extends from a location of the previous first shape (first shape 720) to the current first shape 820. In this example, the transaction data is displayed such that it appears as though a tail is displayed that tracks or otherwise follows the previous increment to the current increment.

In this example, the selectable interface element 630 has been updated to the selectable interface element 830 that may be selected to pause the updating of the graph.

Figure 9:
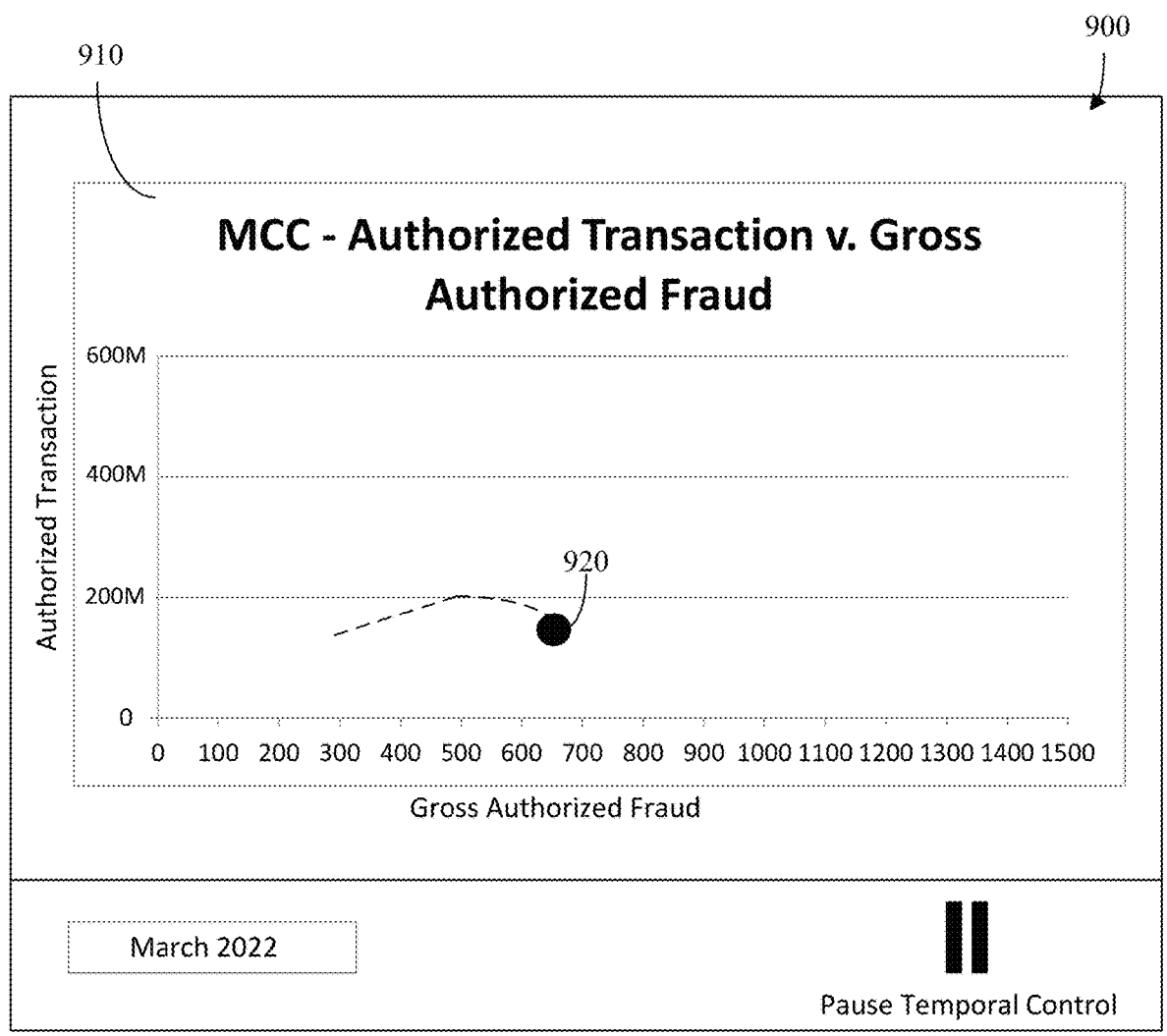
Figure 10:
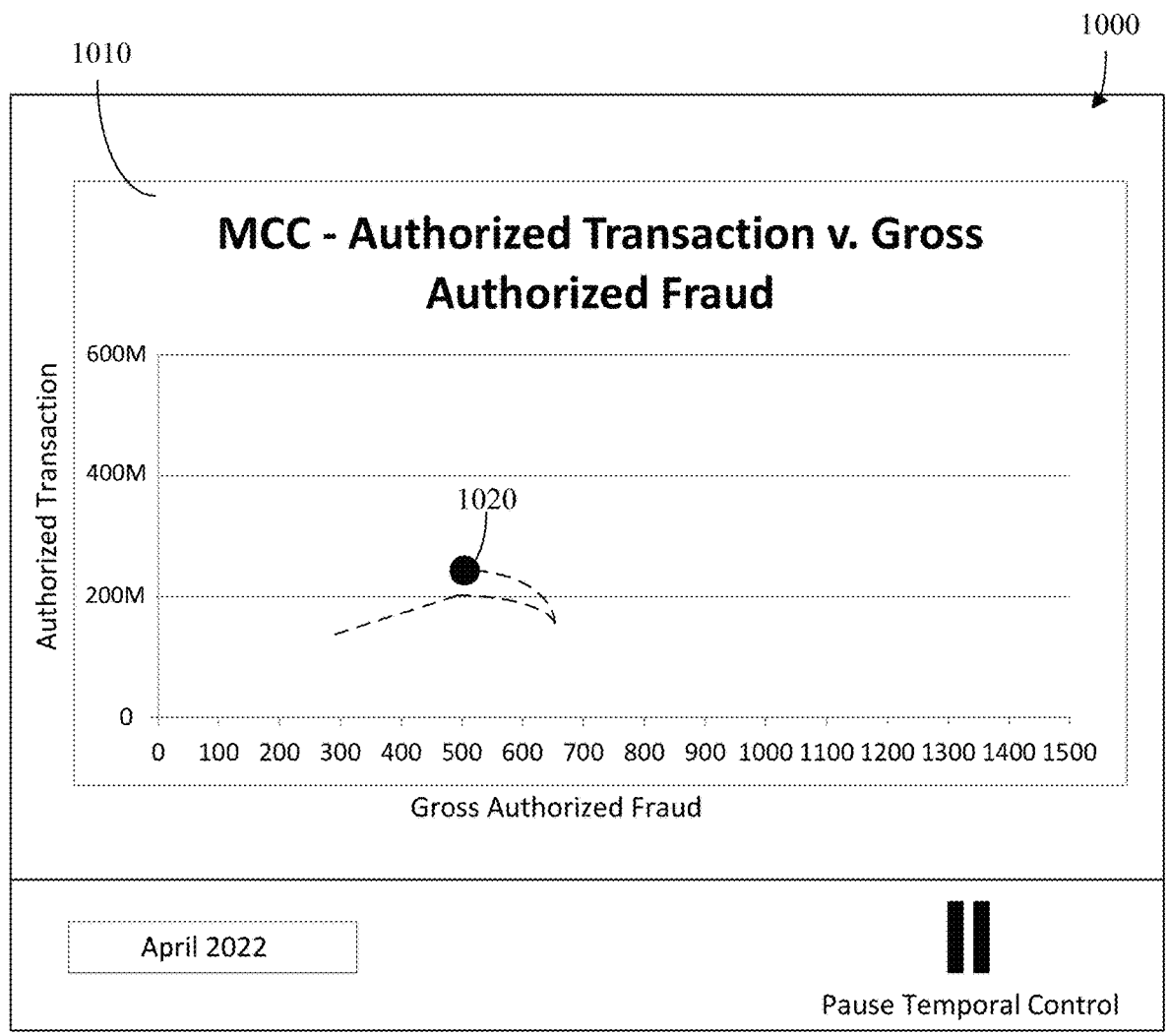
Figure 11:
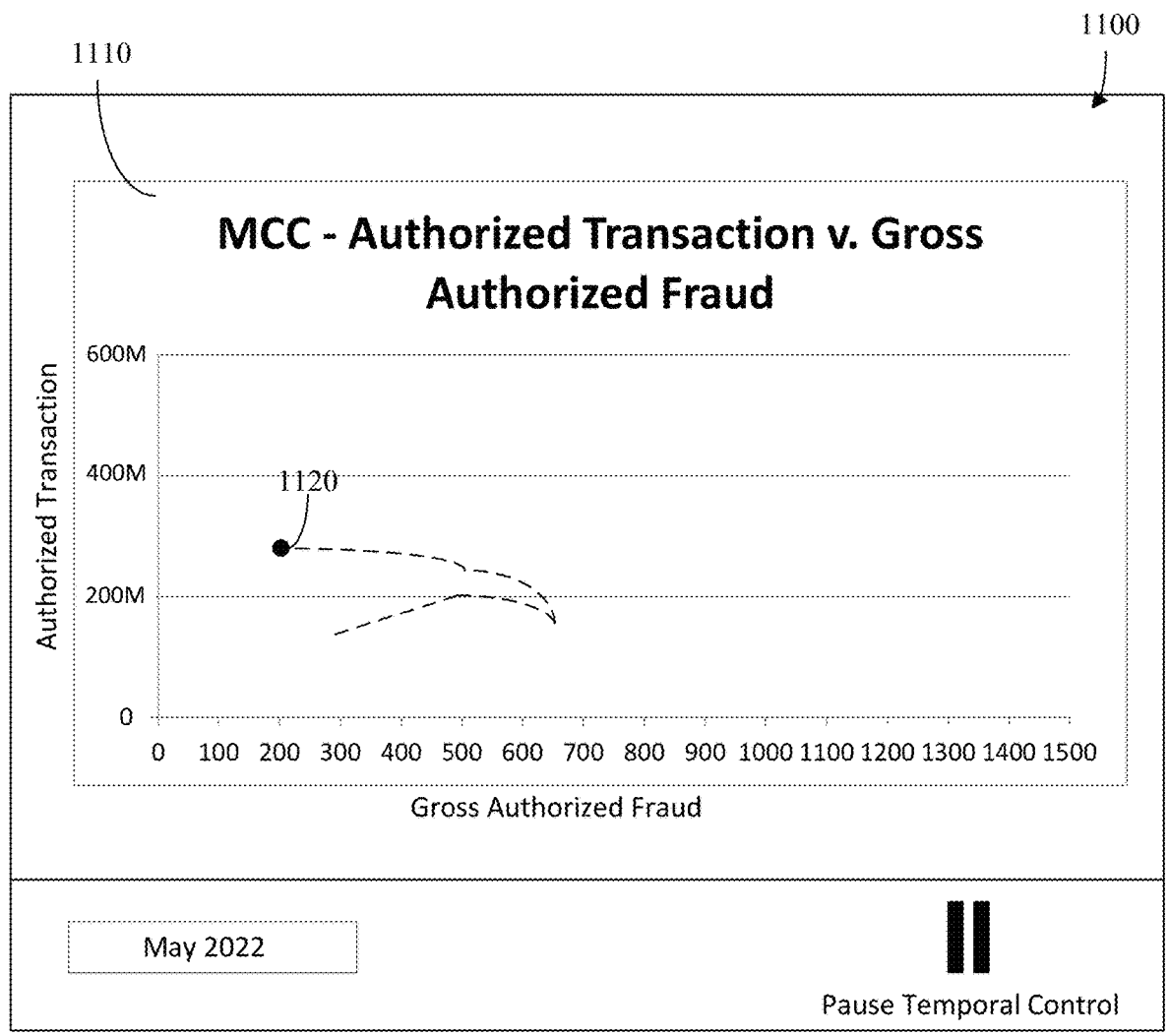

The server computer system 120 continuously performs operations to update the graph to display transaction data in increments from the first time period to a second time period. Further updated graphical user interfaces 900, 1000, 1100 are shown in FIG. 9, FIG. 10 and FIG. 11, respectively. As can be seen, the server computer system 120 has updated the graphs which are identified as graphs 910, 1010, 1110 in FIG. 9, FIG. 10 and FIG. 11, respectively. The graphs 910, 1010, 1110 display transaction data from the data bucket for the months of March 2022, April 2022 and May 2022, respectively. Transaction data from the current increment continues to be displayed in a first format (first shapes 920, 1020, 1120) and transaction data from the one or more previous increments is displayed as a dashed line.

Figure 12:
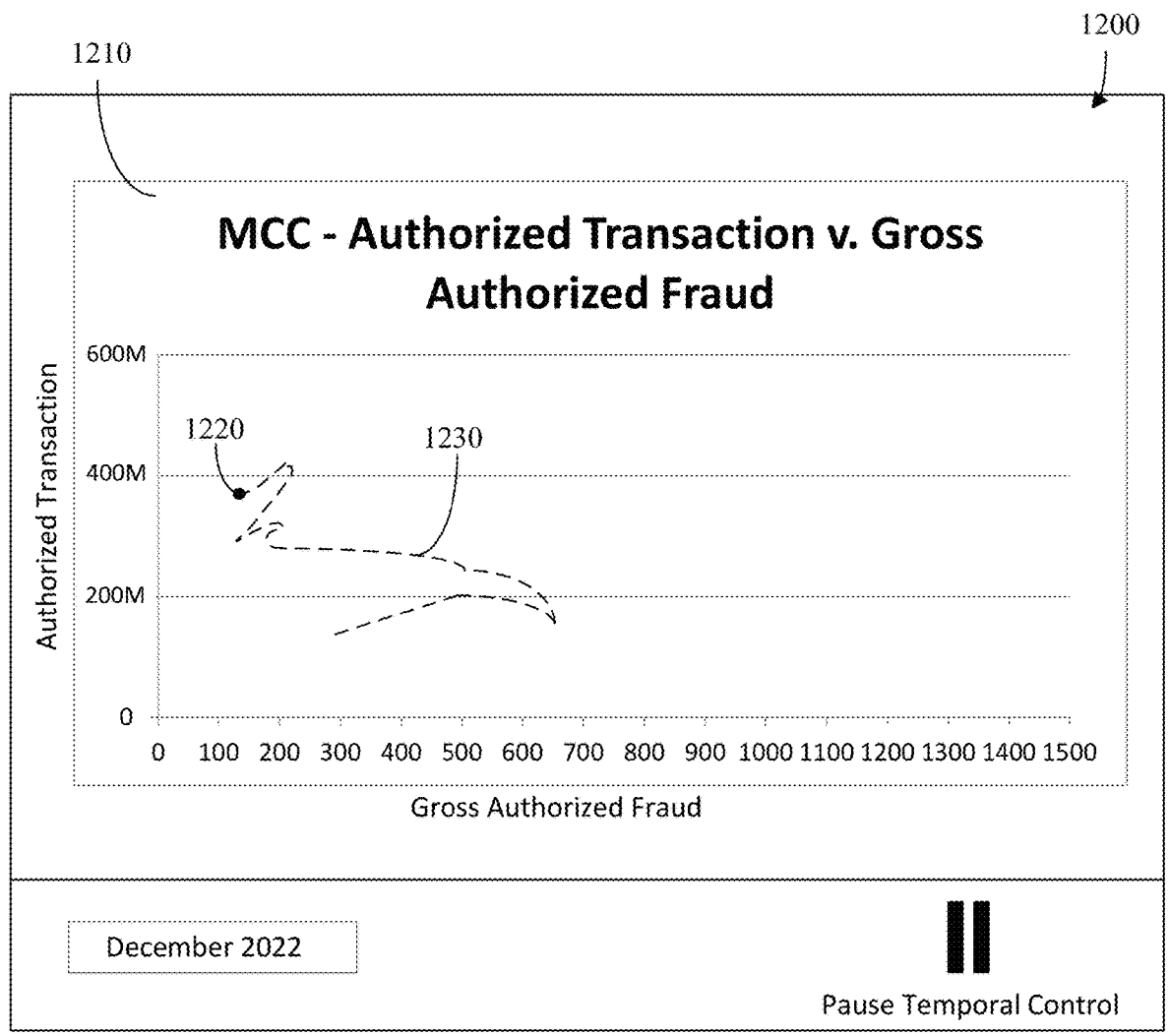

The server computer system 120 continues to update the graph to display the transaction data in increments until the second time period is displayed. An example graphical user interface 1200 for a second time period is shown in FIG. 12. As can be seen, the graphical user interface 1200 includes a graph 1210 that displays transaction data from the previous increments and the current increment. As shown, the current increment is displayed in the first format which is the first shape 1220. The previous increments are displayed in the second format which includes a dashed line. Specifically, the previous increments are displayed such that a tail 1230 is displayed that tracks or otherwise follows previous increments to the current increment.

It will be appreciated that in one or more embodiments, the graphical user interface may include a graph that displays at least some of the transaction data from a plurality of data buckets and may include a selectable interface element to enable temporal control to display the at least some of the transaction data from the plurality of data buckets in increments from a first time period to a second time period. For example, graphs similar to those shown in FIG. 6 to FIG. 12 may display transaction data for a number of data buckets, where each data bucket is associated with a particular merchant category code. In this manner, temporal control may be enabled to display at least some of the transaction data from the plurality of data buckets in increments from a first time period to a second time period and this may allow a user to easily and conveniently analyze, track and interpret big data without having to navigate to separate windows or separate screens. This may further allow a user to easily compare transaction data from different data buckets to generate fraud strategies and/or fraud policies for one or more of the data buckets in an attempt to reduce or eliminate the risk of fraudulent transactions. Further, the user of a tail as the graphical user interface is updated from previous increments to a current increment allows a user to easily compare the transaction data over time for the different data buckets.

In one or more embodiments, the at least one selectable interface element may include one or more selectable interface elements for filtering or adjusting a current display of the graphical user interface. For example, a selectable interface in the form of a drop-down menu may be displayed to select or deselect what transaction data is to be displayed on the graphical user interface. Put another way, the drop-down menu may be used to select one or more of the data buckets and in response the graphical user interface may be updated to display the transaction data from the selected one or more data buckets.

In one or more embodiments, the at least one graphical user interface may include a plurality of graphical user interface tiles arranged on the display, where each one of the graphical user interface tiles display at least some of the transaction data from at least one of the data buckets.

Figure 13:

An example graphical user interface 1300 is shown in FIG. 13. As can be seen, the graphical user interface 1300 includes a plurality of graphical user interface tiles 1310, 1320, 1330, 1340 and 1350 arranged in a tile configuration on the display. The graphical user interface 1300 includes a tile 1360 that may include one or more selectable interface elements for adjusting or updating the graphical user interface 1300. The one or more selectable interface elements may include a selectable interface element for enabling temporal control and/or for filtering or adjusting a current display of the graphical user interface. The one or more selectable interface elements may simultaneously adjust the graphical user interface tiles arranged on the display. For example, a selectable interface element may be selectable to enable temporal control and as such all of the graphical user interface tiles may be updated to display the transaction data in increments from a first time period to a second time period.

Figure 14:
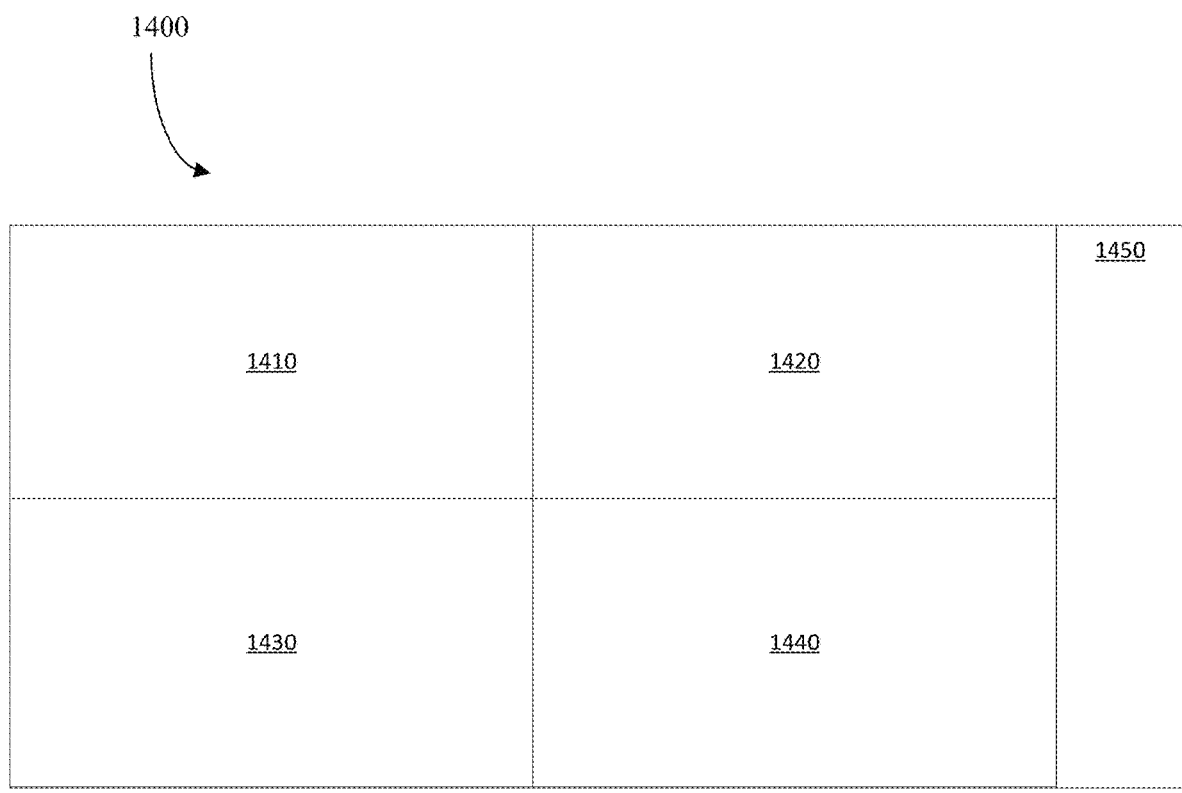

Another example graphical user interface 1400 is shown in FIG. 14. As can be seen, the graphical user interface 1400 includes a plurality of graphical user interface tiles 1410, 1420, 1430 and 1440 arranged in a tile configuration on the display. The graphical user interface 1400 includes a tile 1450 that may include one or more selectable interface elements for adjusting or updating the graphical user interface 1400. The one or more selectable interface elements may include a selectable interface element for enabling temporal control and/or for filtering or adjusting a current display of the graphical user interface. The one or more selectable interface elements may simultaneously adjust the graphical user interface tiles arranged on the display. For example, a selectable interface element may be selectable to enable temporal control and as such all of the graphical user interface tiles may be updated to display the transaction data in increments from a first time period to a second time period.

Figure 15:
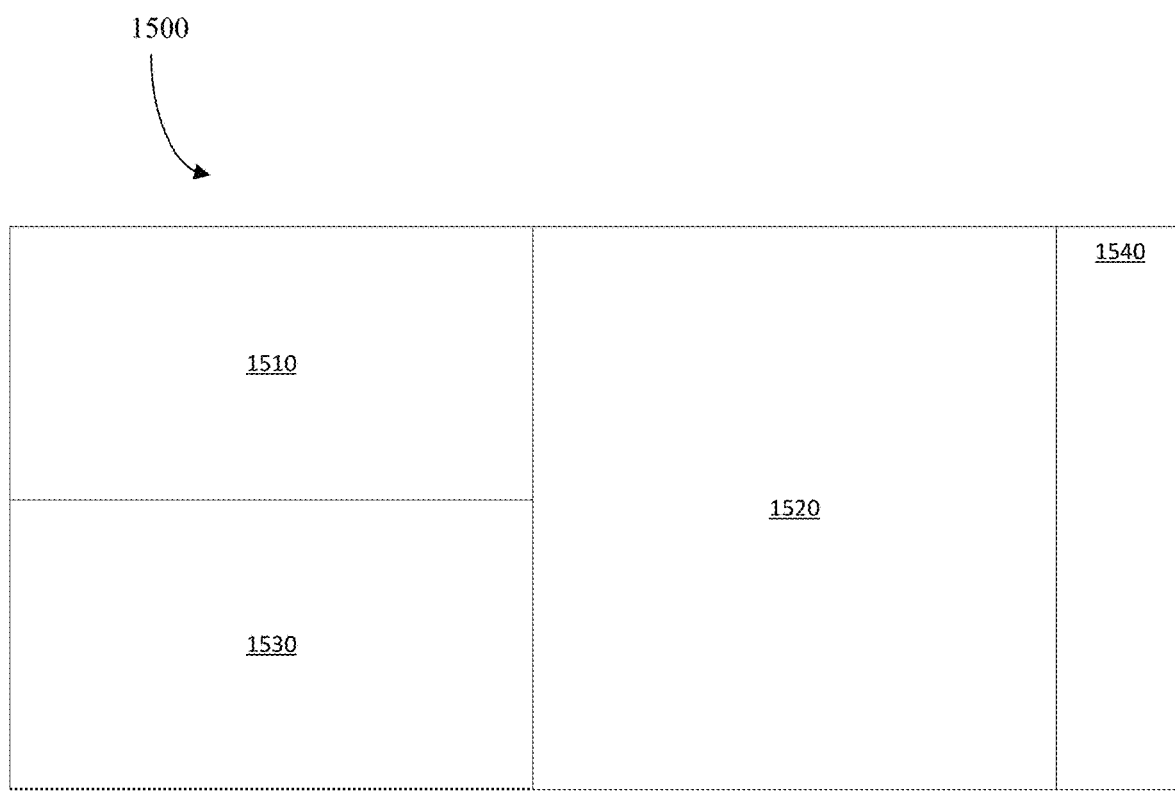

Another example graphical user interface 1500 is shown in FIG. 15. As can be seen, the graphical user interface 1500 includes a plurality of graphical user interface tiles 1510, 1520 and 1530 arranged in a tile configuration on the display. The graphical user interface 1500 includes a tile 1540 that may include one or more selectable interface elements for adjusting or updating the graphical user interface 1500. The one or more selectable interface elements may include a selectable interface element for enabling temporal control and/or for filtering or adjusting a current display of the graphical user interface. The one or more selectable interface elements may simultaneously adjust the graphical user interface tiles arranged on the display. For example, a selectable interface element may be selectable to enable temporal control and as such all of the graphical user interface tiles may be updated to display the transaction data in increments from a first time period to a second time period.

The graphical user interfaces described herein may display particular subsets of the transaction data. For example, a first graphical user interface may be generated to display key performance indicators, a second graphical user interface may be generated to display diagnostic and mitigation information, a third page may be generated to display alerting patterns and accuracy information, and a fourth page may be generated to display diagnostic breakdowns.

Figure 16:
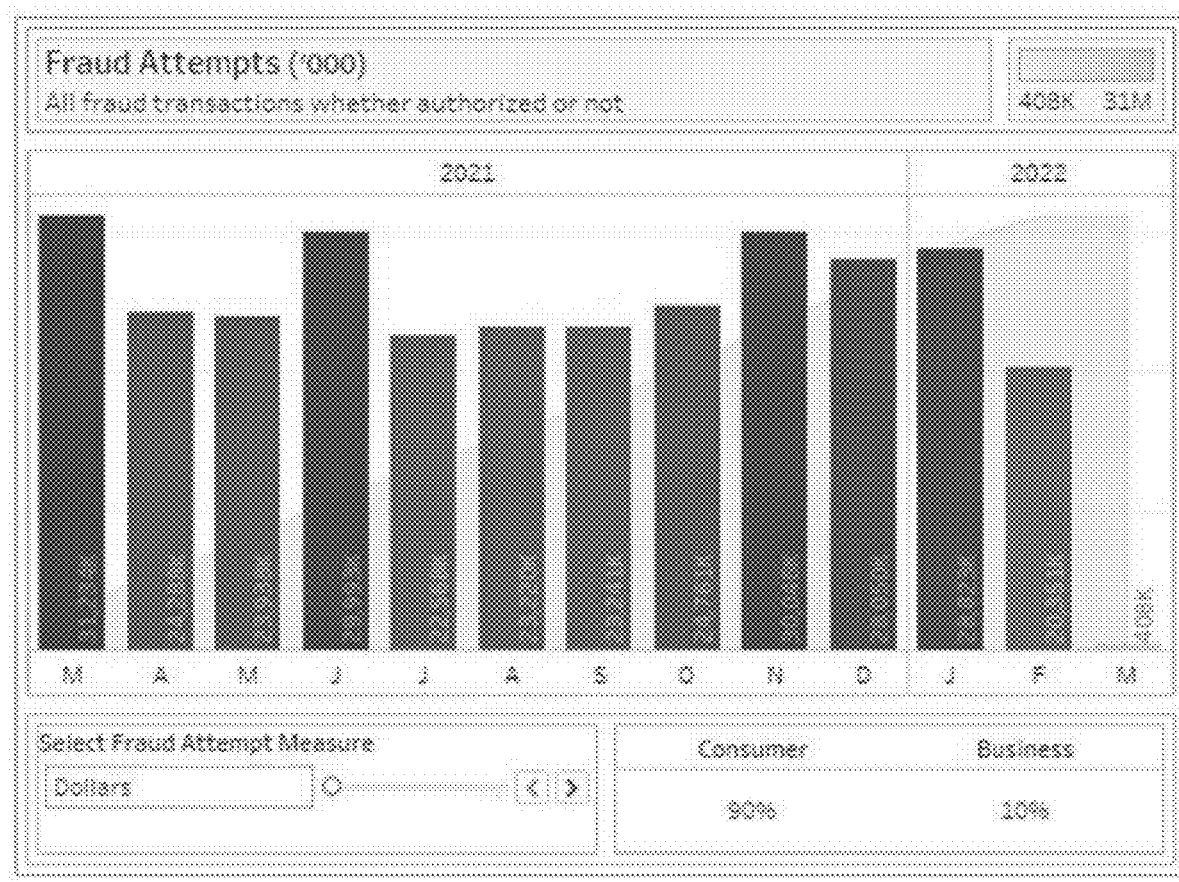
FIGS. 16 to 20 are example charts and/or graphs for displaying key performance indicators.

The key performance indicators may include authorized transactions and a graphical user interface may include a graph representing all transactions flowing into fraud engines that are authorized by the financial institution (FIG. 16).

Figure 17:
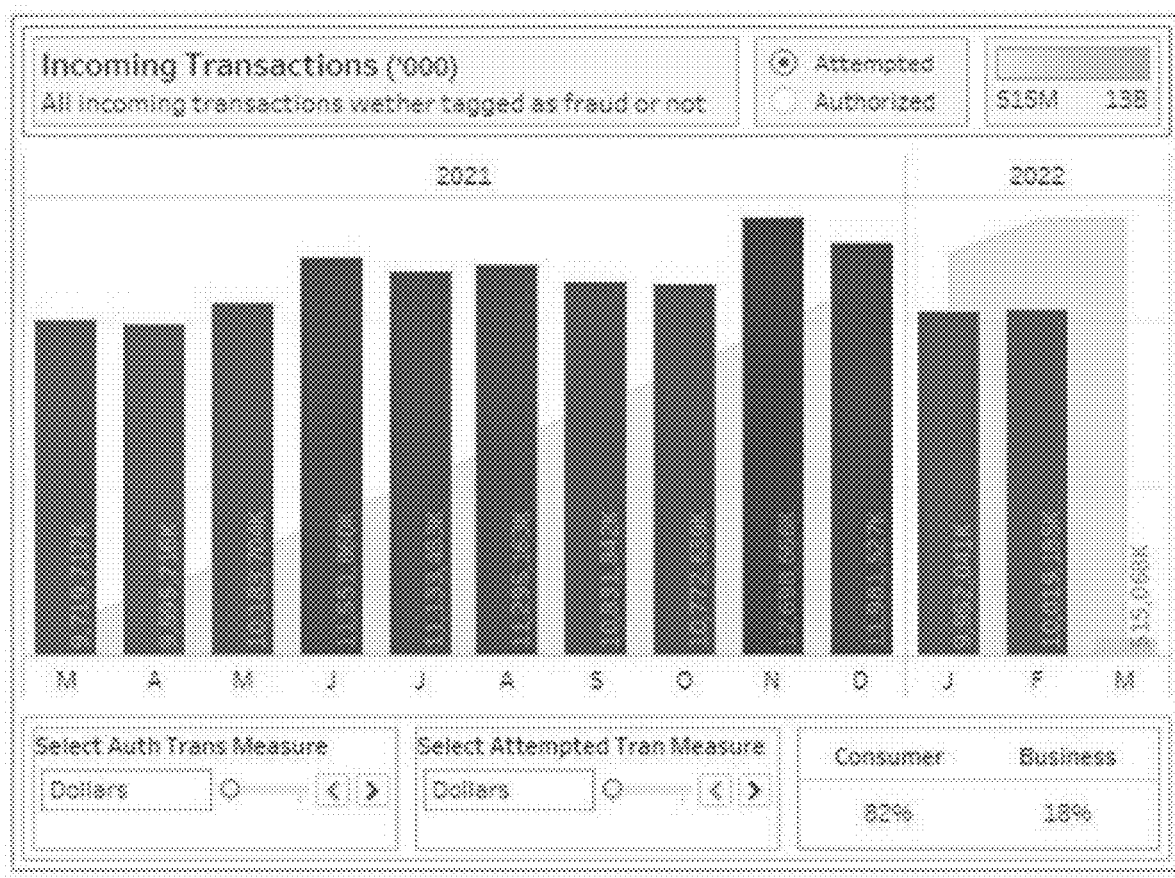

The key performance indicators may include fraud attempts and a graphical user interface may include a graph displaying transactions flowing into fraud engines and tagged as fraud (FIG. 17).

Figure 18:
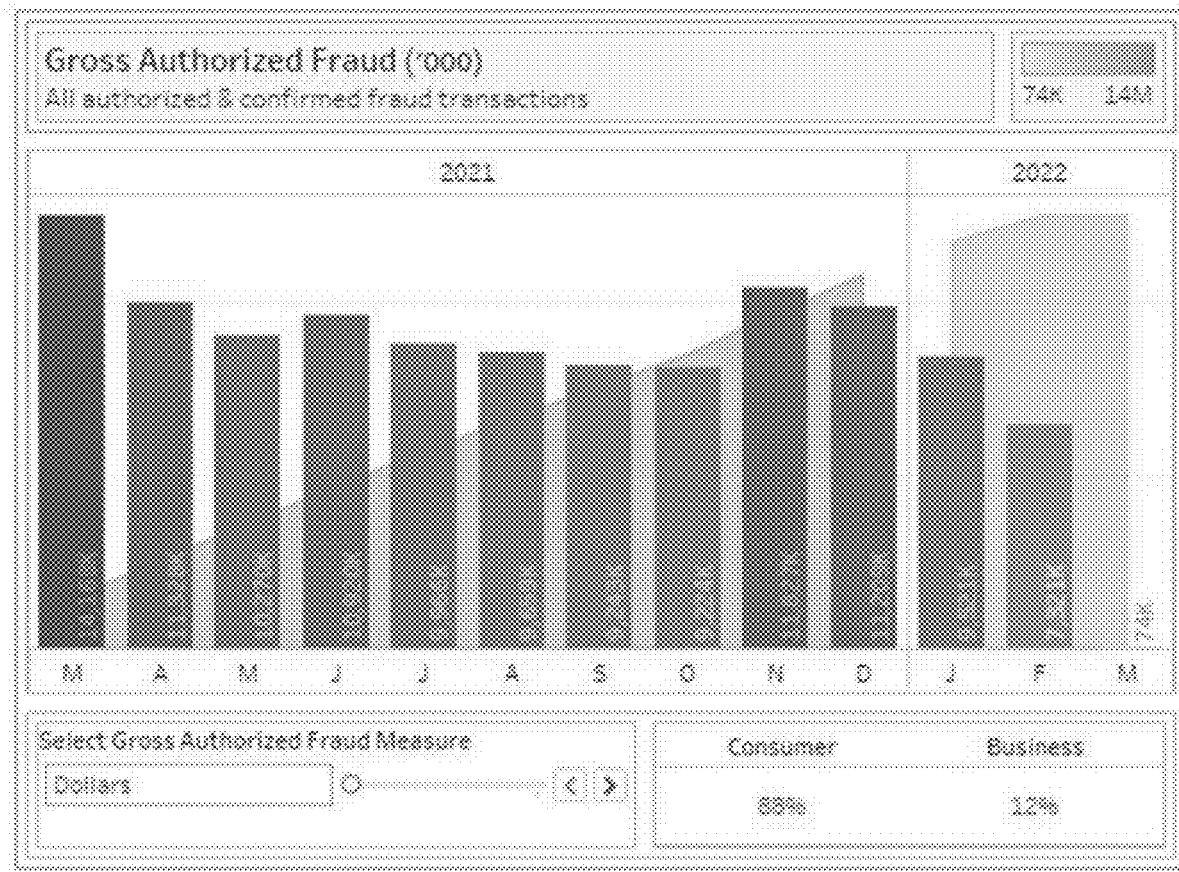

The key performance indicators may include gross authorized fraud and a graphical user interface may include a graph displaying authorized transactions flowing into fraud engines and tagged as fraud (FIG. 18).

Figure 19:
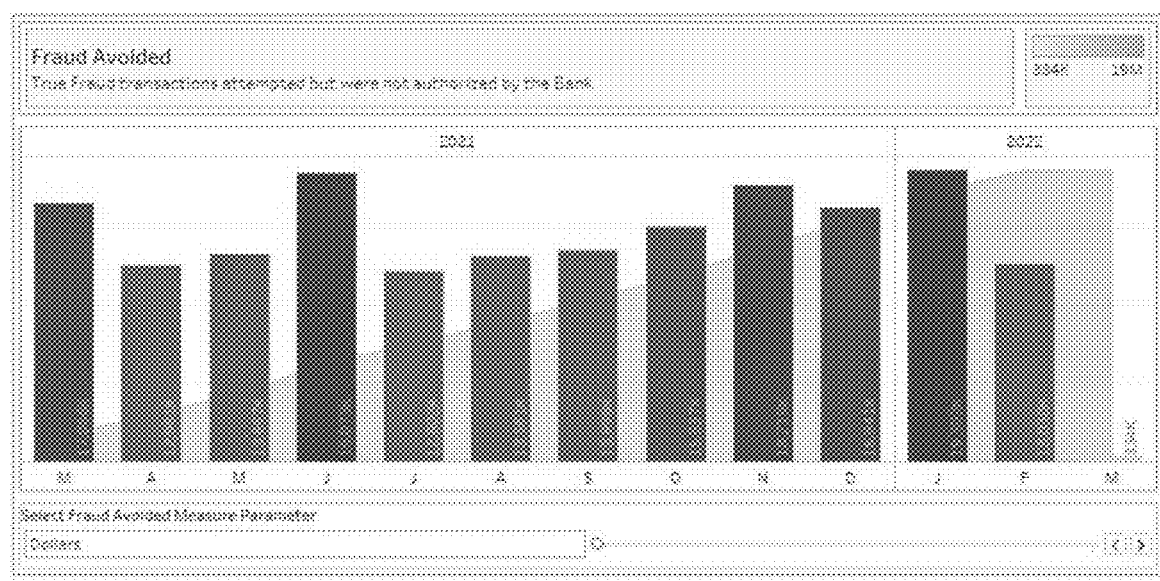

The key performance indicators may include fraud avoided and a graphical user interface may include a graph displaying fraud transactions that were attempted but not authorized by the financial institution (FIG. 19).

Figure 20:
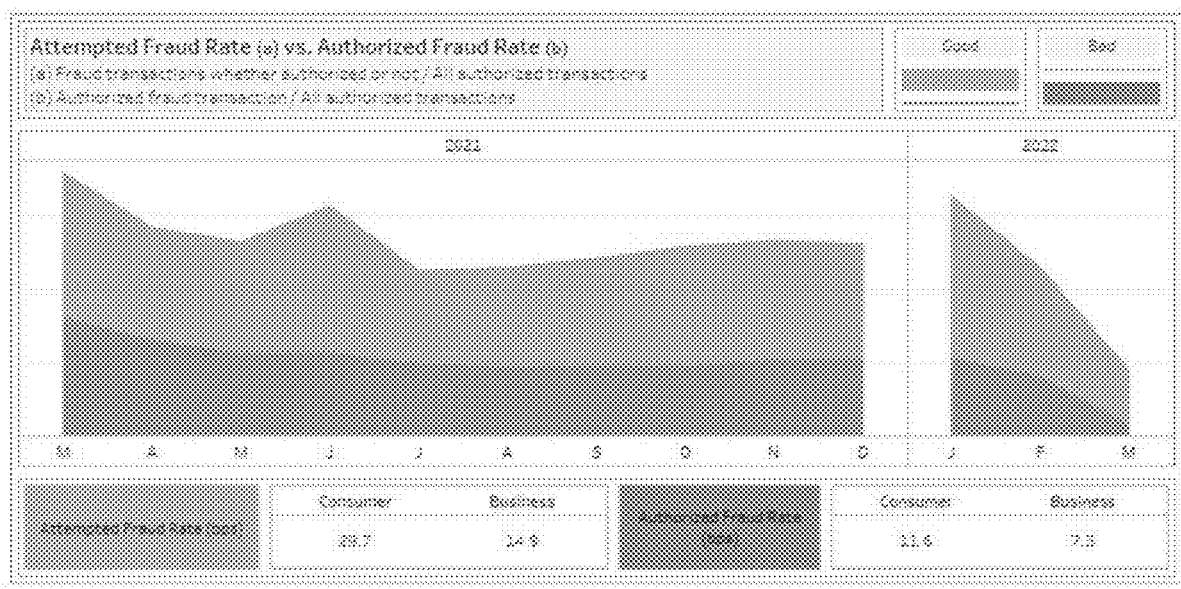

The key performance indicators may include efficiency metrics such as for example an attempted fraud rate. In this example, a graphical user interface may include a graph displaying a measure of how the financial institution is attacked by fraudsters over time. Another example of an efficiency metric may include approved fraud rate. In this example, a graphical user interface may include a graph displaying a measure of how much fraud has circumvented fraud controls over time. It will be appreciated that the efficiency metrics may be displayed on the same graph such that a user may easily compare the efficiency metrics (FIG. 20).

Figure 21:
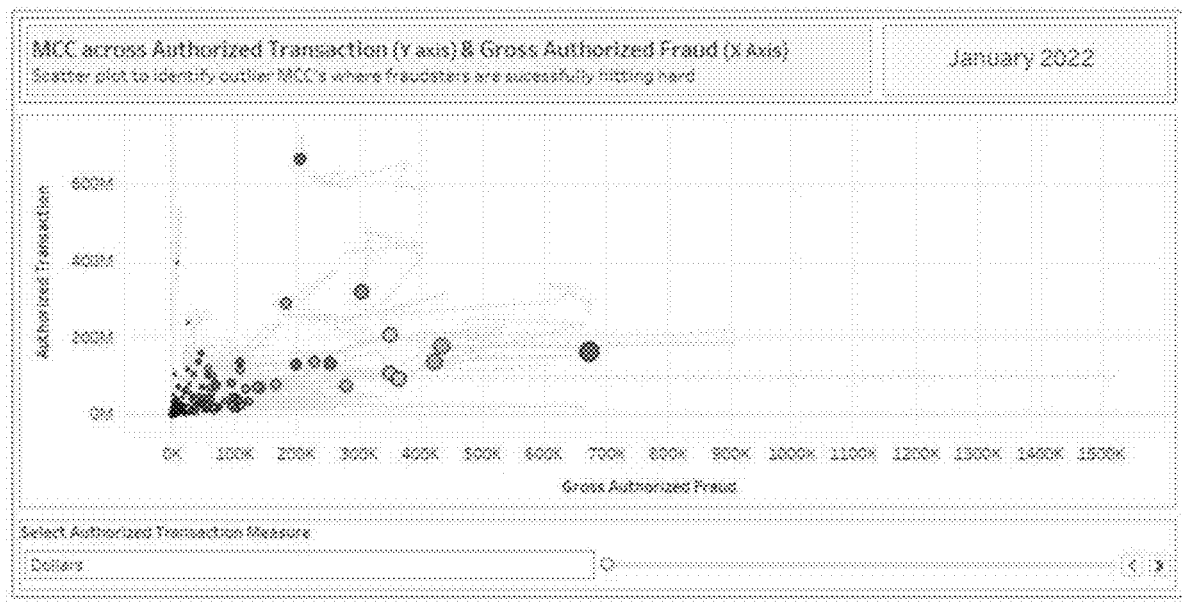
FIGS. 21 to 24 are example charts and/or graphs for displaying diagnostic and mitigation information.
Figure 22:
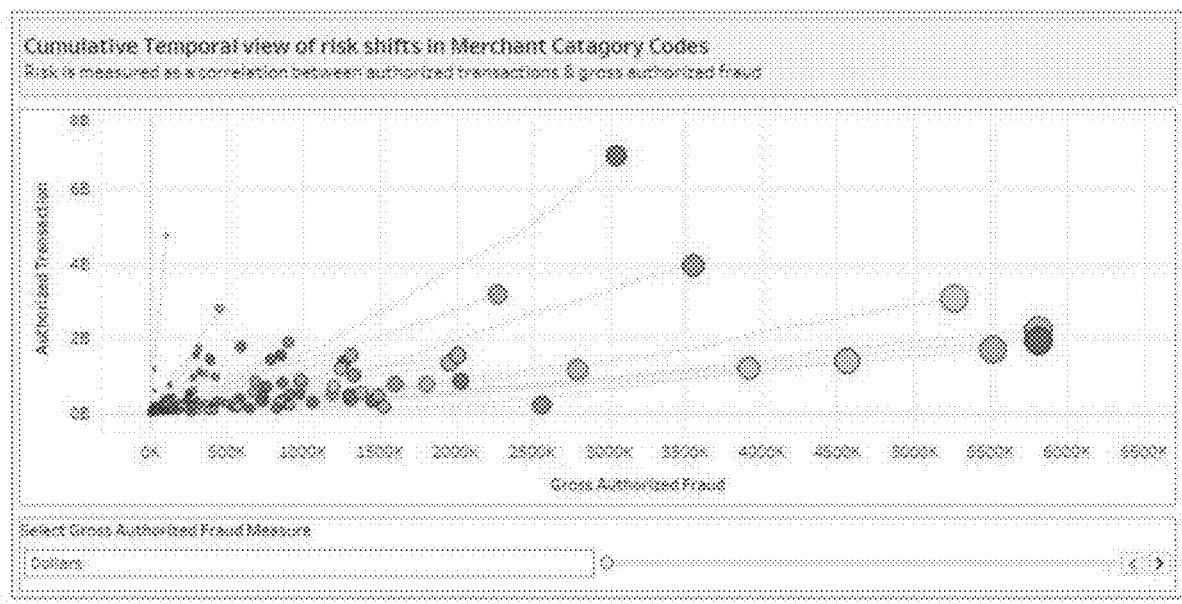

The diagnostic and mitigation information may include chronological movements of merchant category codes and one or more graphical user interfaces may includes graphs such as for example scatter plots that may project how particular merchant category codes move over time in response to shifting fraud trends, upstream and structural changes in fraud landscape as well as new strategy implementations (FIG. 21 and FIG. 22).

Figure 23:
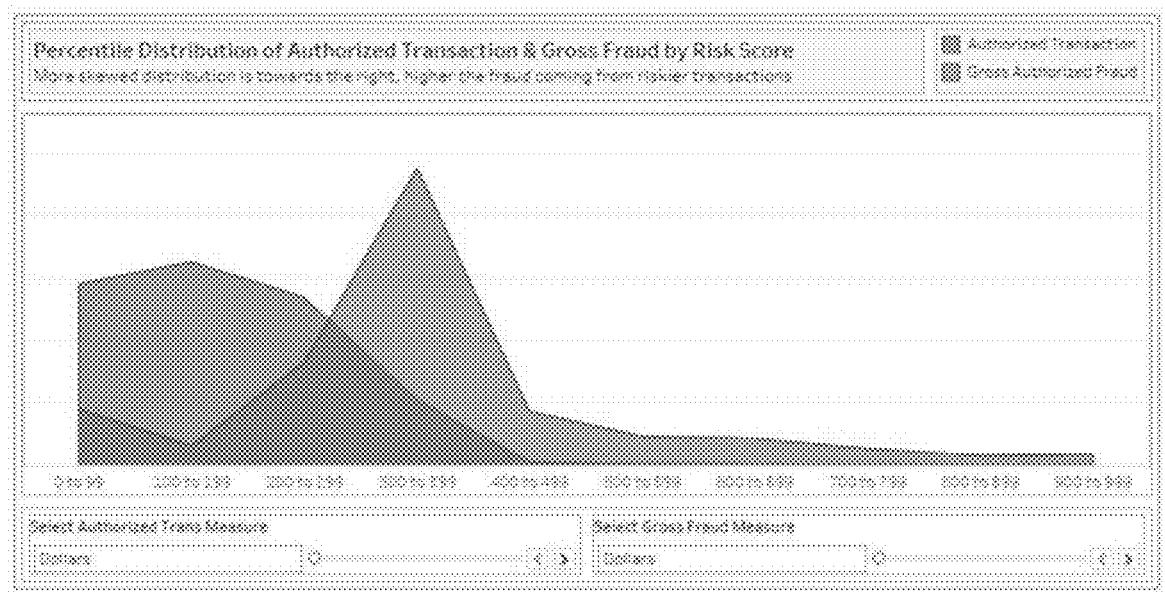

The diagnostic and mitigation information may include distribution of authorized transactions and gross authorized fraud by risk score and a graphical user interface include a graph that allows users to compare the magnitude of risk inherent in the gross authorized fraud versus authorized transactions. The risk scores may be obtained from, for example, a third party server associated with a payment provider (FIG. 23).

Figure 24:
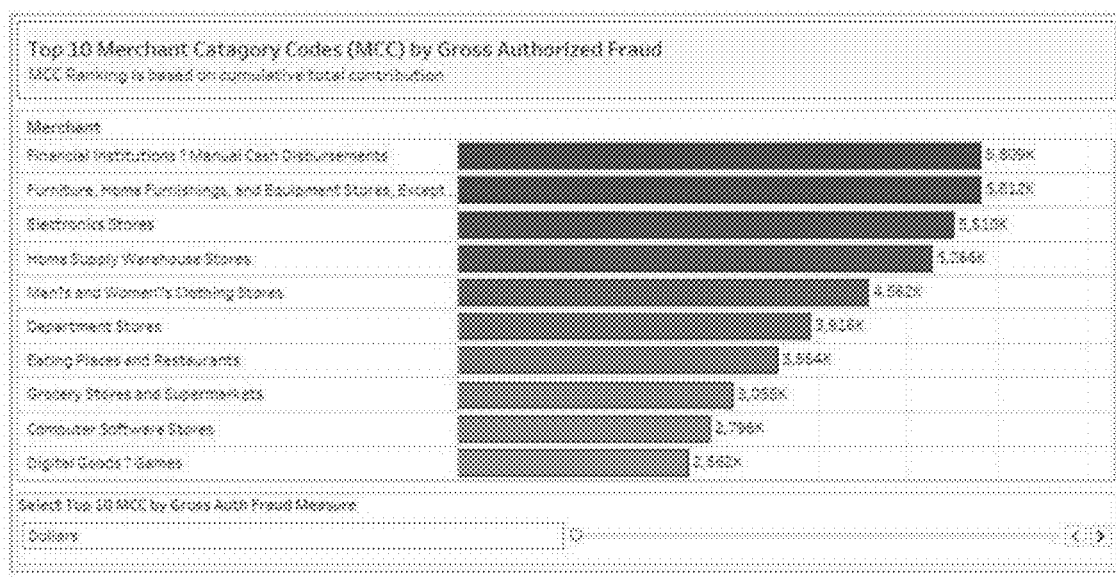

The diagnostic and mitigation information may include a graphical user interface that includes a list of the top merchant category codes ranked by gross authorized fraud (FIG. 24).

Figure 25:
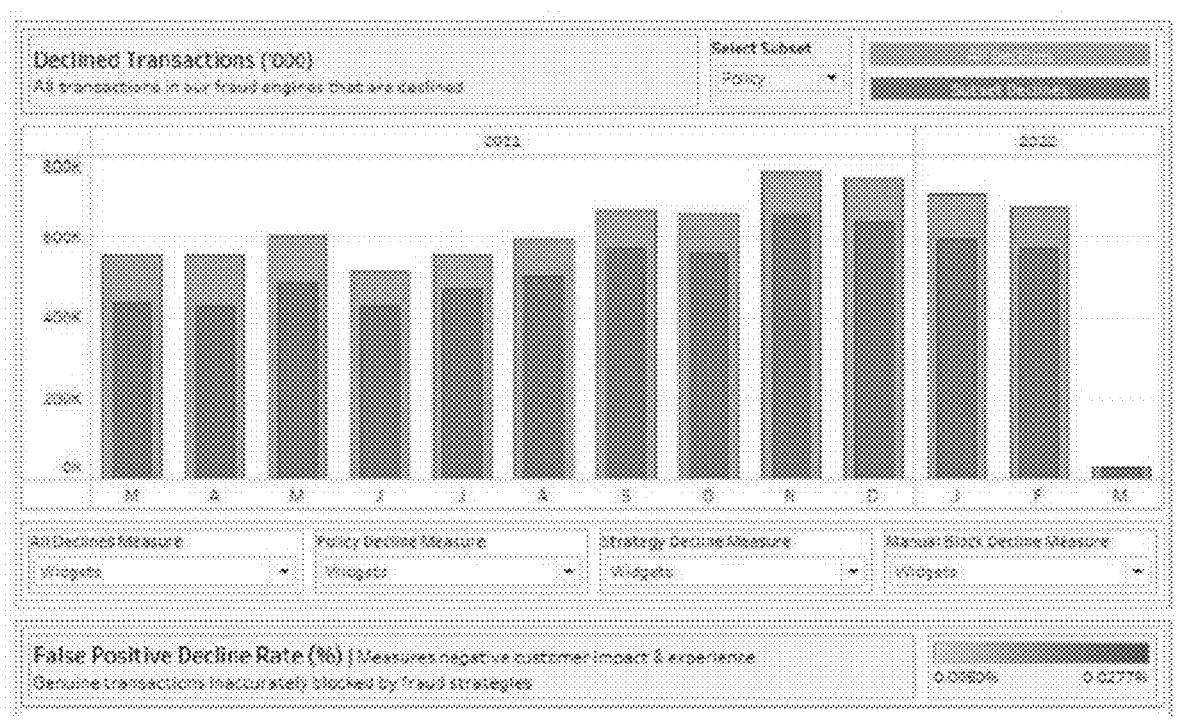
FIGS. 25 to 28 are example charts and/or graphs for displaying alerting patterns and accuracy information.

The alerting patterns and accuracy information may include transactions declined by strategies and may include a graphical user interface that includes a graph that displays a measure of how many transactions are declined by a fraud ecosystem over time. The graphical user interface may include one or more selectable interface elements that may be used to view a subset of information such as trends on transactions that were declined through policy declines, strategy declines or manual block declines. The policy declines may include declines made at the fraud prevention stage, the strategy declines may include declines made through strategies, and the manual block declines may include declines as a result of manual blocks by agents (FIG. 25).

Figure 26:
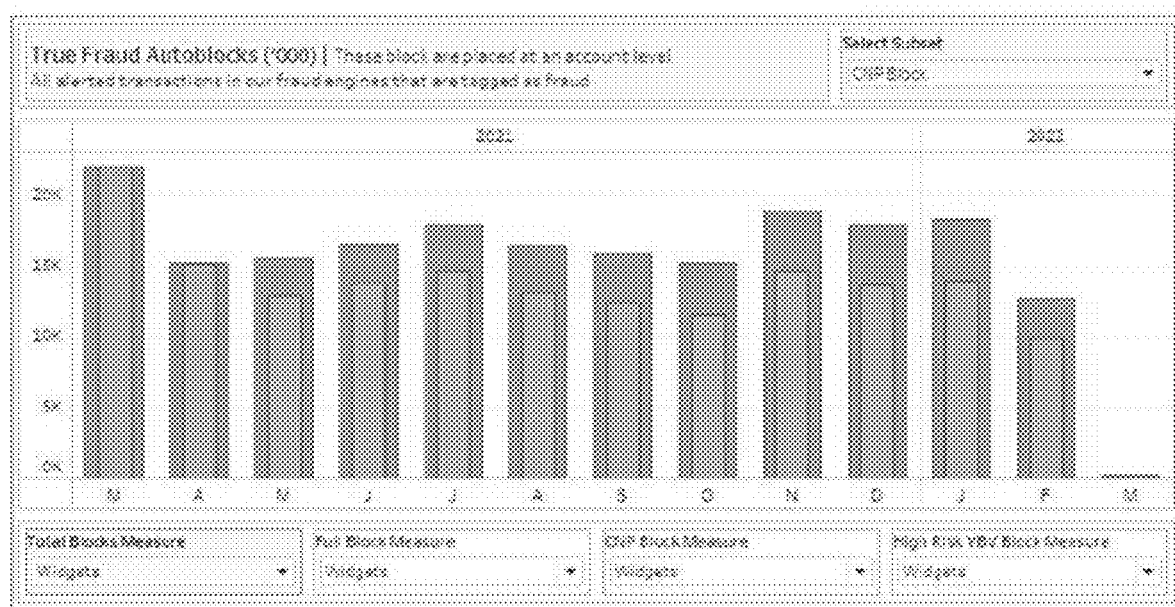

The alerting patterns and accuracy information may include a graphical user interface that includes a graph that displays autoblocks placed at an account level (FIG. 26).

Figure 27:
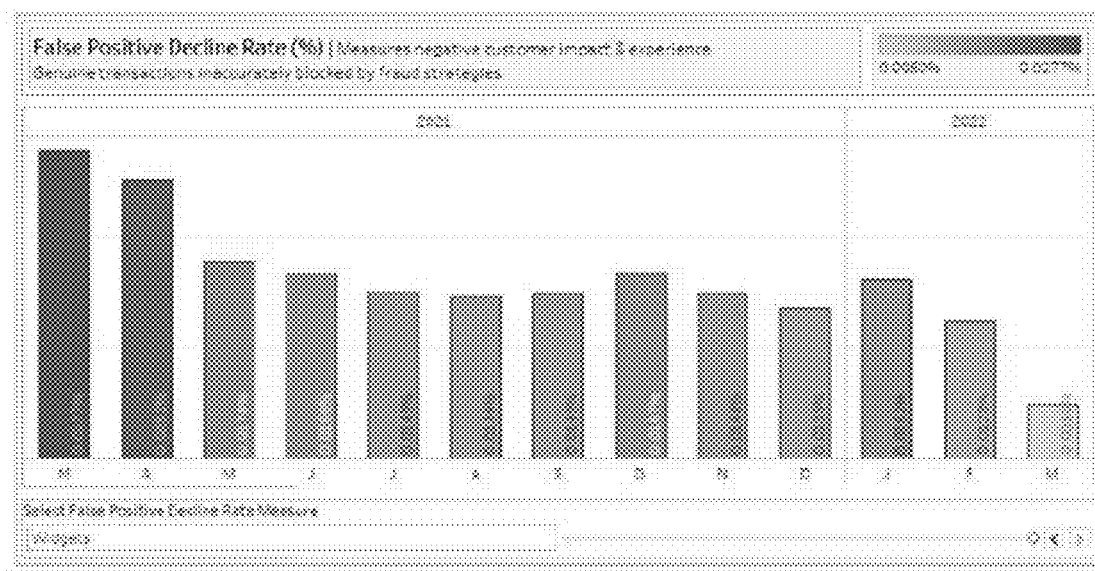
Figure 28:
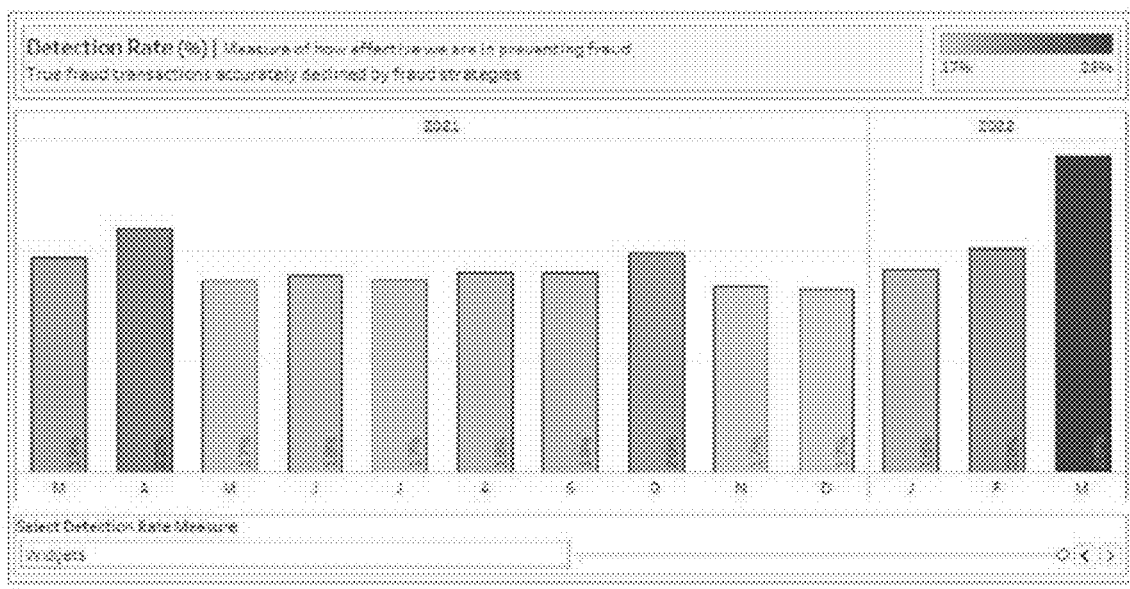

The alerting patterns and accuracy information may include decision accuracy metrics. The decision accuracy metrics may include a false positive decline rate and as such a graphical user interface may include a graph displaying a measure of how many genuine transactions are inaccurately blocked by strategies (FIG. 27). The decision accuracy metrics may include a detection rate and as such a graphical user interface may include a graph that displays a measure of how many true fraud transactions were accurately declined by strategies or fraud controls (FIG. 28).

Figure 29:
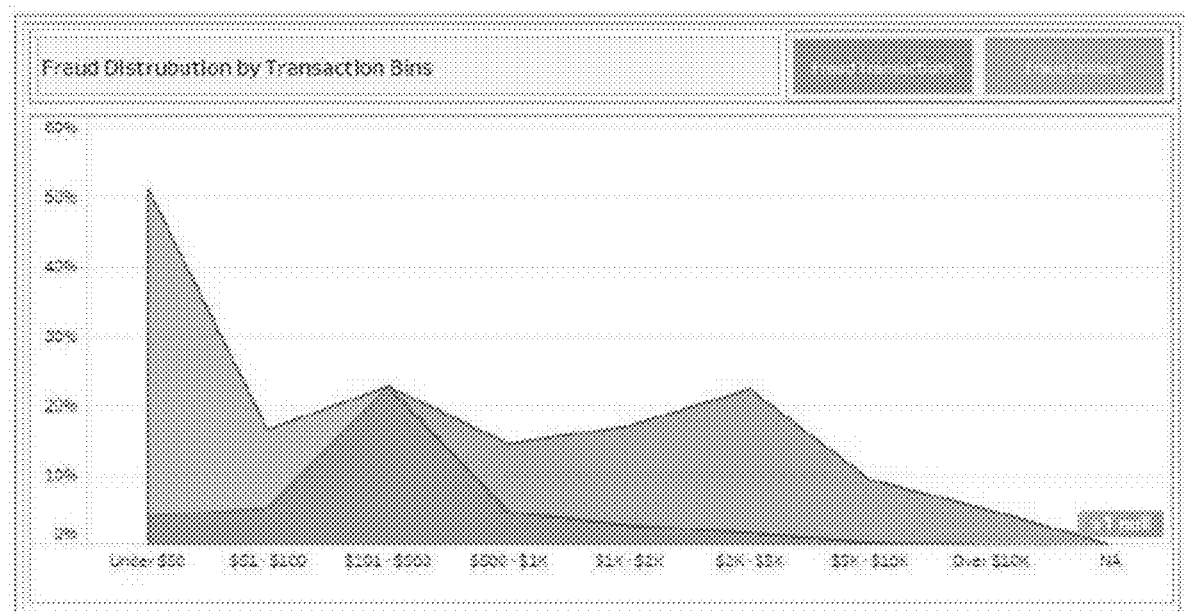
FIGS. 29 to 31 are example charts and/or graphs for displaying diagnostic breakdowns.

The diagnostic breakdowns may include fraud distribution by transaction bins and a graphical user interface may include a graph that displays gross authorized fraud by transaction value ranges. In one or more embodiments, the graph may be superimposed to display distribution of fraud dollars over time to provide insights into areas of fraud concentration (FIG. 29).

Figure 30:
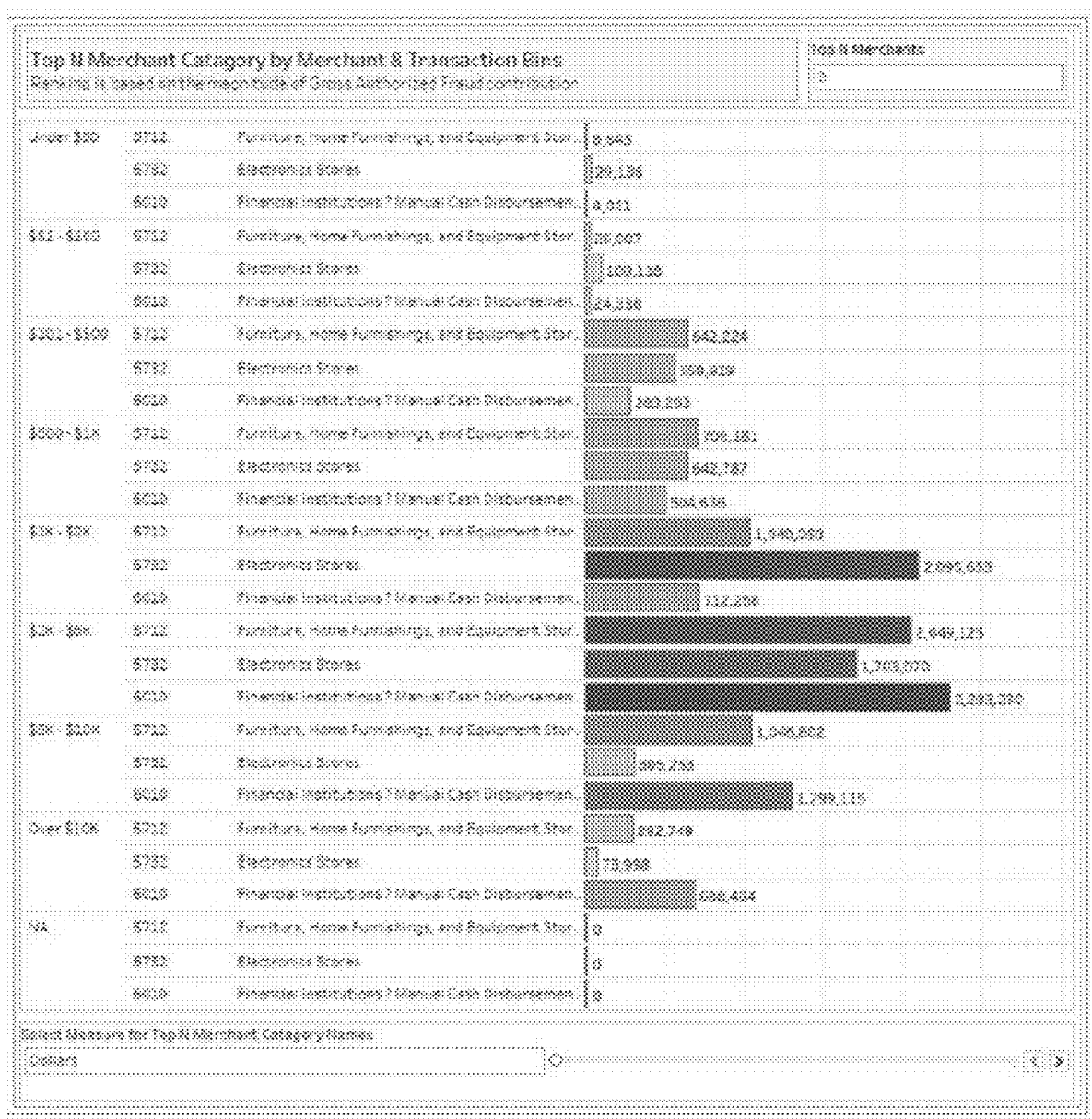

The diagnostic breakdowns may include fraud severity and customers impacted by transaction bins and a graphical user interface may include a chart that compares an average fraud loss per customer and a number of customers by transaction value ranges to provide insights into magnitude of negative customer impact under each transaction value bucket (FIG. 30).

Figure 31:
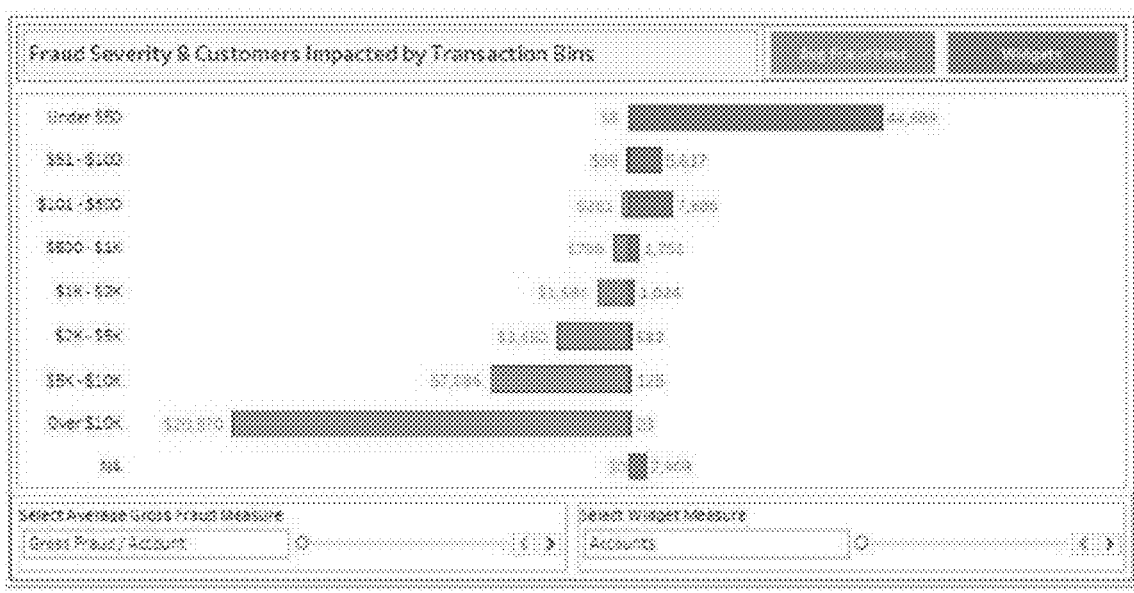

The diagnostic breakdowns may include a top 'N' merchant category by merchant and transaction bins and a graphical user interface may include a graph that displays gross fraud contributed overtime by the top 'N' merchants by transaction value ranges, where 'N' is the number of merchants (FIG. 31).

In manners described herein, a server computer system obtains a big data dataset that includes transaction data. The server computer system categorizes the transaction data into a number of data buckets and generates at least one graphical user interface to display at least some of the transaction data from at least one of the data buckets. The graphical user interface includes at least one selectable interface element for adjusting a display of the graphical user interface. In this manner, the server computer system generates a graphical user interface that may be used to track, analyze and interpret big data that includes the transaction data. The graphical user interface may be used to generate fraud strategies and/or fraud policies in an attempt to reduce or eliminate the risk of fraudulent transactions.

In manners described herein, the selectable interface elements may be utilized to generate a graphical user interface for a particular data bucket or for particular data buckets. The selectable interface elements may enable temporal control that may cause the graphical user interface to display the transaction data from at least one of the data buckets in increments from a first time period to a second time period and this may allow big data to be easily and conveniently displayed to generate fraud strategies and/or fraud policies in an attempt to reduce or eliminate the risk of fraudulent transactions. Further, the graphical user interface may allow big data to easily and conveniently be displayed to identify whether or not implemented fraud strategies and/or fraud policies are effective in reducing or eliminating the risk of fraudulent transactions.

In manners described herein, the graphical user interface may include a number of graphical user interface tiles arranged on the display. By allowing multiple graphical user interface tiles to be displayed adjacent to one another on a single display, the user is able to easily and conveniently analyze, track and interpret big data without having to navigate to separate windows or separate screens to view transaction data from one or more data buckets as categorized by the server computer system.

The methods described herein may be modified and/or operations of such methods combined to provide other methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the herein discussed embodiments are considered to be illustrative and not restrictive.

What is claimed is:

1. A computer server system comprising:
a communications module;
a processor coupled with the communications module; and
a memory coupled to the processor and storing processor-executable instructions which, when executed by the processor, configure the processor to:
categorize a dataset into a number of data buckets;
analyze data from at least one of the data buckets to generate at least one graphical user interface to display at least some of the data from the at least one of the data buckets, the at least one graphical user interface including a selectable interface element to enable temporal control to automatically adjust the display of the graphical user interface to display at least some of the data from the at least one of the data buckets in increments where one or more previous increments are displayed such that a tail is displayed that tracks the one or more previous increments to a current increment; and
send, via the communications module and to a computing device, the at least one graphical user interface for display.

2. The computer server system of claim 1, wherein the processor-executable instructions, when executed by the processor, further configure the processor to:
receive, via the communications module and from the computing device, a signal indicating selection of the selectable interface element to enable the temporal control to display the at least some of the data from the at least one of the data buckets in increments; and
adjust, in real-time, the at least one graphical user interface to display the at least some of the data in increments.

3. The computer server system of claim 1, wherein the at least one graphical user interface is adjusted to display the at least some of the data in increments such that the data from a current increment is displayed in a first format and data from the one or more previous increments is displayed in a second format.

4. The computer server system of claim 3, wherein the first format includes a first shape and wherein the second format includes a dashed line.

5. The computer server system of claim 4, wherein a size of the first shape is dependent on at least some of the data.

6. The computer server system of claim 1, wherein the at least one graphical user interface includes a plurality of graphical user interface tiles arranged on the display, each one of the graphical user interface tiles to display at least some of the data from at least one of the data buckets.

7. The computer server system of claim 6, wherein the graphical user interface includes at least one selectable interface element to simultaneously adjust the plurality of graphical user interface tiles arranged on the display.

8. The computer server system of claim 1, wherein the data buckets include at least one of authorized transactions, fraud attempts, authorized fraud, avoided fraud, merchant category code, policy declines, strategy declines, manual block declines, or transaction amount.

9. The computer server system of claim 1, wherein the data from the at least one of the data buckets is displayed in increments from a first time period to a second time period.

10. The computer server system of claim 1 wherein the tail is displayed as a dashed-line.

11. The computer server system of claim 1, wherein categorizing the dataset into the number of data buckets includes using a classifier that assigns data to the data buckets based on a merchant category code.

12. A computer-implemented method comprising:
categorizing a dataset into a number of data buckets;
analyzing data from at least one of the data buckets to generate at least one graphical user interface to display at least some of the data from the at least one of the data buckets, the at least one graphical user interface including a selectable interface element to enable temporal control to automatically adjust the display of the graphical user interface to display at least some of the data from the at least one of the data buckets in increments where one or more previous increments are displayed such that a tail is displayed that tracks the one or more previous increments to a current increment; and
sending, via a communications module and to a computing device, the at least one graphical user interface for display.

13. The computer-implemented method of claim 12, further comprising:
receiving, via the communications module and from the computing device, a signal indicating selection of the selectable interface element to enable the temporal control to display the at least some of the data from the at least one of the data buckets in increments; and
adjusting, in real-time, the at least one graphical user interface to display the at least some of the data in increments.

14. The computer-implemented method of claim 12, wherein the at least one graphical user interface is adjusted to display the at least some of the data in increments such that the data from a current increment is displayed in a first format and data from one or more previous increments is displayed in a second format.

15. The computer-implemented method of claim 14, wherein the first format includes a first shape and wherein the second format includes a dashed line.

16. The computer-implemented method of claim 15, wherein a size of the first shape is dependent on at least some of the data.

17. The computer-implemented method of claim 12, wherein the at least one graphical user interface includes a plurality of graphical user interface tiles arranged on the display, each one of the graphical user interface tiles to display at least some of the data from at least one of the data buckets.

18. The computer-implemented method of claim 17, wherein the graphical user interface includes at least one selectable interface element to simultaneously adjust the plurality of graphical user interface tiles arranged on the display.

19. The computer-implemented method of claim 12, wherein the data buckets include at least one of authorized transactions, fraud attempts, authorized fraud, avoided fraud, merchant category code, policy declines, strategy declines, manual block declines, or transaction amount.

20. A non-transitory computer readable storage medium comprising computer-executable instructions which, when executed, configure a processor to:
    categorize a dataset into a number of data buckets;
    analyze data from at least one of the data buckets to generate at least one graphical user interface to display at least some of the data from the at least one of the data buckets, the at least one graphical user interface including a selectable interface element to enable temporal control to automatically adjust the display of the graphical user interface to display at least some of the data from the at least one of the data buckets in increments where one or more previous increments are displayed such that a tail is displayed that tracks the one or more previous increments to a current increment; and
    send, via a communications module and to a computing device, the at least one graphical user interface for display.

* * * * *